US012670390B2

(12) United States Patent
Jandial et al.

(10) Patent No.: US 12,670,390 B2
(45) Date of Patent: Jun. 30, 2026

(54) SYSTEMS AND METHODS FOR GENERATING SYNTHETIC TABULAR DATA FOR MACHINE LEARNING AND OTHER APPLICATIONS

(71) Applicant: ADOBE INC., San Jose, CA (US)

(72) Inventors: Surgan Jandial, Noida Uttar Pradesh (IN); Siddarth Ramesh, Hyderabad Telangana (IN); Piyush Gupta, Noida Uttar Pradesh (IN); Gauri Gupta, Cambridge, MA (US); Balaji Krishnamurthy, Noida Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 663 days.

(21) Appl. No.: 18/295,094

(22) Filed: Apr. 3, 2023

(65) Prior Publication Data

US 2024/0330682 A1 Oct. 3, 2024

(51) Int. Cl.
*G06N 3/08* (2023.01)
*G06N 3/0455* (2023.01)

(52) U.S. Cl.
CPC ............. *G06N 3/08* (2013.01); *G06N 3/0455* (2023.01)

(58) Field of Classification Search
CPC ............................... G06N 3/08; G06N 3/0455
See application file for complete search history.

(56) References Cited

U.S. PATENT DOCUMENTS

| | | | | |
|---|---|---|---|---|
| 12,367,375 B2 * | 7/2025 | Fatemi | .................. | G06N 5/022 |
| 2020/0134415 A1 * | 4/2020 | Haidar | ................. | G06N 3/0464 |
| 2021/0057104 A1 * | 2/2021 | Krebs | ................. | A61B 5/0044 |
| 2021/0295105 A1 * | 9/2021 | Sallee | ................... | G06N 3/088 |
| 2022/0374682 A1 * | 11/2022 | Nica | ................... | G06N 3/0464 |

(Continued)

OTHER PUBLICATIONS

Burez, J., et al., "Handling class imbalance in customer churn prediction", Expert Systems with Applications, Elsevier, vol. 36, No. 3, pp. 4626-4636 (2009).

(Continued)

*Primary Examiner* — David E Choi
(74) *Attorney, Agent, or Firm* — Shook, Hardy & Bacon L.L.P.

(57) ABSTRACT

Systems and methods for generating synthetic tabular data for machine learning and other applications are provided. In some embodiments, a variational autoencoder is trained to learn inter-feature correlations found in tabular data collected from real data sources. The trained variational autoencoder is used to train a generator model of a Generative Adversarial Network (GAN) to generate synthetic tabular data that exhibits the inter-feature correlation distribution found in the tabular data collected from real data sources. In some embodiments, processing devices perform operations comprising: receiving a set of tabular data records, each record comprising a plurality of features; training a first machine learning model using the tabular data records to learn correlations between the plurality of features; and training a second machine learning model, using the first machine learning model, to generate a synthetic tabular data records based at least on the one or more correlations between the plurality of features.

19 Claims, 11 Drawing Sheets

(56) References Cited

U.S. PATENT DOCUMENTS

| | | | | |
|---|---|---|---|---|
| 2023/0104431 A1* | 4/2023 | Smyth | G10L 15/16 | |
| | | | 704/243 | |
| 2023/0143072 A1* | 5/2023 | Flöther | G06N 10/00 | |
| | | | 706/12 | |
| 2024/0104368 A1* | 3/2024 | Moatti | G06N 3/08 | |
| 2024/0249158 A1* | 7/2024 | Narayanan | G06N 5/022 | |
| 2024/0310500 A1* | 9/2024 | Demirel | G06N 3/0475 | |
| 2024/0330682 A1* | 10/2024 | Jandial | G06N 3/045 | |
| 2024/0353827 A1* | 10/2024 | Lebacher | G05B 23/0272 | |

OTHER PUBLICATIONS

Hyland, S., L., et al., "Real-Valued (Medical) Time Series Generation With Recurrent Conditional GANS", arXiv:1706.02633, pp. 13 (Dec. 4, 2017).

Jabbar, A., et al., "A Survey on Generative Adversarial Networks: Variants, Applications, and Training", ACM Computing Surveys (CSUR), pp. 1-38 (2021).

Pang, G., et al., "Deep Learning for Anomaly Detection: A Review", ACM Computing Surveys, vol. 54, Issue 2, Article 38, pp. 1-38 (Mar. 2021).

Poongodi, M., et al., "New York City taxi trip duration prediction using MLP and XGBoost", International Journal of System Assurance Engineering and Management, Springer, vol. 13, No. 1, pp. S16-S27 (Mar. 2022).

Shey, H., and Lannopollo, E., "Demystifying De-Identification, Anonymization, and Pseudonymization", Retrieved from Internet URL : https://www.forrester.com/report/demystifying-de-identificationanonymization-and-pseudonymization/RES158075, accessed on Mar. 21, 2023, pp. 9 (Aug. 2, 2021).

Xu, L., et al., "Modeling Tabular Data using Conditional GAN", 33rd Conference on Neural Information Processing Systems, Advances in Neural Information Processing Systems 32, pp. 1-15 (2019).

Provost, F., "Machine Learning from Imbalanced Data Sets 101", Extended Abstract, Invited paper for the AAAI'2000 Workshop on Imbalanced Data Sets, pp. 1-3 (Nov. 17, 2008).

Tran-The, T., D., "How to Evaluate Any Tabular Synthetic Dataset", Retrieved from Internet URL: <https://towardsdatascience.com/how-to-evaluate-any-tabular-synthetic-dataset-8865b7ee0c23>, accessed on Jan. 17, 2023, pp. 10 (Aug. 25, 2022).

Cartella, F., et al., "Adversarial Attacks for Tabular Data: Application to Fraud Detection and Imbalanced Data", arXiv:2101.08030, pp. 1-9 (Jan. 20, 2021).

Guo, H., et al., "DeepFM: A Factorization-Machine based Neural Network for CTR Prediction", arXiv:1703.04247, pp. 1-8 (Mar. 13, 2017).

Jordon, J., et al., "Pate-GAN: Generating Synthetic Data With Differential Privacy Guarantees", In International conference on learning representations, pp. 1-21 (2019).

Park, N., et al., "Data Synthesis based on Generative Adversarial Networks", In Proceedings of the VLDB Endowment, arXiv:1806.03384, vol. 11, No. 10, pp. 1-16 (Jul. 2, 2018).

Reiter, J., P., "Using Cart to Generate Partially Synthetic Public Use Microdata", Journal of official statistics, vol. 21, No. 3, pp. 441-462 (2005).

Shwartz-Ziv, R., and Armon, A., "Tabular Data: Deep Learning is Not All You Need", Retrieved from Internet URL : https://doi.org/10.1016/j.inffus.2021.11.011, vol. 81, pp. 1-11 (May 2022).

Zhang, S., "Deep Learning Based Recommender System: A Survey and New Perspectives", ACM Computing Surveys, vol. 52, No. 1, Article. 5, pp. 1-38 (2019).

Chawla, N., V., et al., "SMOTE: Synthetic Minority Over-sampling Technique", Journal of Artificial Intelligence Research, vol. 16, pp. 321-357 (2002).

Morgan, J., P., "Synthetic Data for Real Insights", Retrieved from Internet URL: <https://www.jpmorgan.com/technology/technology-blog/synthetic-data-for-real-insights>, accessed on Mar. 11, 2023, pp. 2.

Avino, L., et al., "Generating Synthetic but Plausible Healthcare Record Datasets", arXiv:1807.01514, ACM, pp. 1-5 (Jul. 4, 2018).

Pozzolo, A., D., et al., "Learned lessons in credit card fraud detection from a practitioner perspective", Expert systems with applications, vol. 41, No. 10, pp. 4915-4928 (2014).

Im, D., J., et al., "Denoising Criterion for Variational Auto-Encoding Framework", In Proceedings of the AAAI Conference on Artificial Intelligence, vol. 31, No. 1, pp. 2059-2065 (2017).

Mottini, A., et al., "Airline Passenger Name Record Generation using Generative Adversarial Networks", arXiv:1807.06657, pp. 1-9 (Jul. 17, 2018).

Patki, N., et al., "The Synthetic data vault", In IEEE International Conference on Data Science and Advanced Analytics, IEEE, pp. 399-410 (2016).

Sanchez-Morales, A., et al., "Improving deep learning performance with missing values via deletion and compensation", Neural Computing and Applications, vol. 32, Issue 17, pp. 13233-13244 (2020).

Wang, Y., and Zhao, Q., "House Price Prediction Based on Machine Learning: A Case of King County", In 7th International Conference on Financial Innovation and Economic Development (ICFIED 2022), Atlantis Press, vol. 648, pp. 1547-1555 (2022).

Ashrapov, I., "Tabular GANs for uneven distribution", arXiv:2010.00638, pp. 1-11 (Oct. 1, 2020).

"One-hot", Wikipedia, Retrieved from Internet URL: https://en.wikipedia.org/wiki/One-hot, accessed on Jan. 17, 2023, pp. 4.

Ahmed, M., et al., "A Survey of Evolution in Predictive Models and Impacting Factors in Customer Churn", Advances in Data Science and Adaptive Analysis, vol. 9, No. 3, 1750007, pp. 1-35 (2017).

Choi, E., et al., "Generating Multi-label Discrete Patient Records using Generative Adversarial Networks", In Machine learning for healthcare conference, PMLR, vol. 68, pp. 1-20 (2017).

Hendrikx, H., "Accelerated methods for distributed optimization", Ph.D. thesis, PSL, HAL Open Science, pp. 1-223 (2021).

Kohavi, R., "Scaling up the Accuracy of Naive-Bayes Classifiers: a Decision-Tree Hybrid", vol. 96, pp. 202-207 (1996).

Patel, S., et al., "Correlated discrete data generation using adversarial training", arXiv:1804.00925, pp. 1-11 (Apr. 3, 2018).

Sallam, R., "Future of Work: Everything Gets Measured and Tracked", Gartner, Retrieved from Internet URL : https://www.gartner.com/document/4007016?ref=hp-wylo, accessed on Mar. 21, 2023, pp. 8 (Oct. 18, 2021).

Sumathi, S., and Sivanandam, S., N., "Introduction to Data Mining Principles", Introduction to Data Mining and its Applications, vol. 38, pp. 1-20 (2006).

Zhao, Z., et al., "CTAB-GAN: Effective Table Data Synthesizing", In Asian Conference on Machine Learning, PMLR, vol. 157, pp. 97-112 (2021).

Vanian, J., "Why American Express is trying technology that makes deepfake videos look real", Retrieved from Internet URL : <https://fortune.com/2020/09/03/american-express-deepfake-artificial-intelligence/>, accessed on Mar. 11, 2023, pp. 2 (Sep. 3, 2020).

* cited by examiner

400

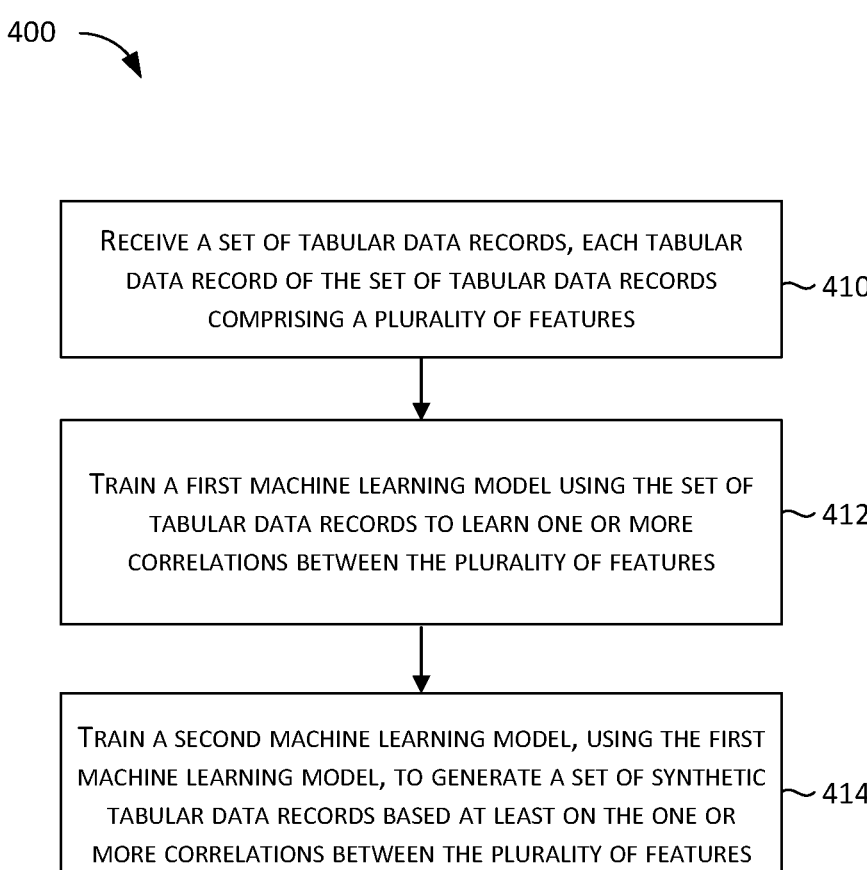

RECEIVE A SET OF TABULAR DATA RECORDS, EACH TABULAR DATA RECORD OF THE SET OF TABULAR DATA RECORDS COMPRISING A PLURALITY OF FEATURES ~410

TRAIN A FIRST MACHINE LEARNING MODEL USING THE SET OF TABULAR DATA RECORDS TO LEARN ONE OR MORE CORRELATIONS BETWEEN THE PLURALITY OF FEATURES ~412

TRAIN A SECOND MACHINE LEARNING MODEL, USING THE FIRST MACHINE LEARNING MODEL, TO GENERATE A SET OF SYNTHETIC TABULAR DATA RECORDS BASED AT LEAST ON THE ONE OR MORE CORRELATIONS BETWEEN THE PLURALITY OF FEATURES ~414

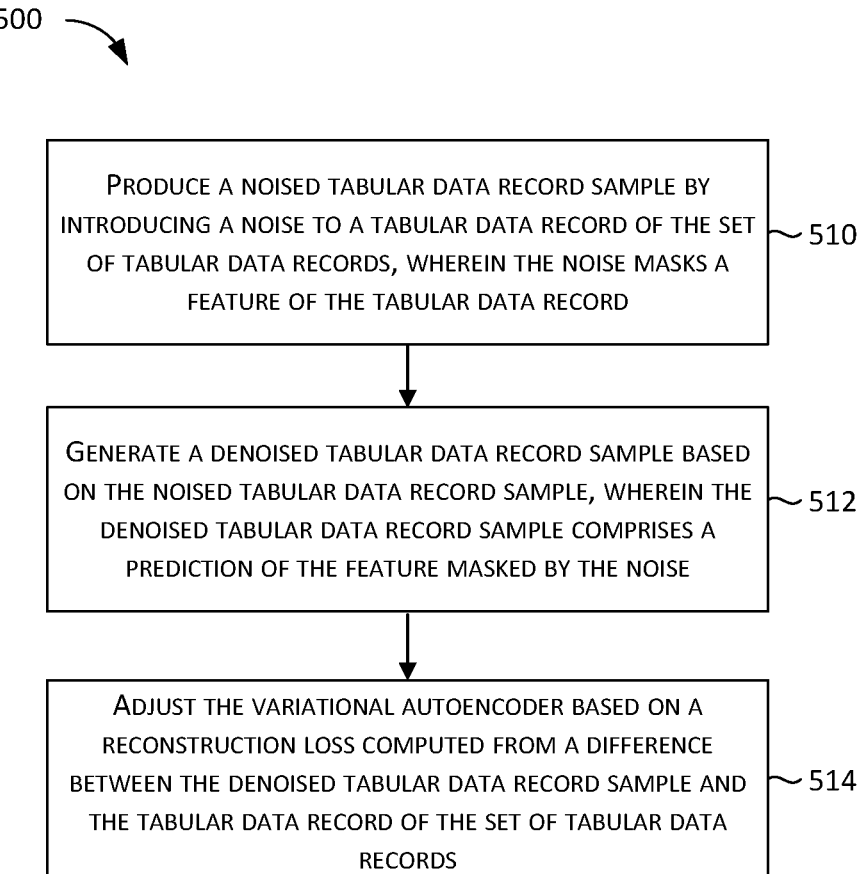

PRODUCE A NOISED TABULAR DATA RECORD SAMPLE BY INTRODUCING A NOISE TO A TABULAR DATA RECORD OF THE SET OF TABULAR DATA RECORDS, WHEREIN THE NOISE MASKS A FEATURE OF THE TABULAR DATA RECORD  ~510

GENERATE A DENOISED TABULAR DATA RECORD SAMPLE BASED ON THE NOISED TABULAR DATA RECORD SAMPLE, WHEREIN THE DENOISED TABULAR DATA RECORD SAMPLE COMPRISES A PREDICTION OF THE FEATURE MASKED BY THE NOISE  ~512

ADJUST THE VARIATIONAL AUTOENCODER BASED ON A RECONSTRUCTION LOSS COMPUTED FROM A DIFFERENCE BETWEEN THE DENOISED TABULAR DATA RECORD SAMPLE AND THE TABULAR DATA RECORD OF THE SET OF TABULAR DATA RECORDS  ~514

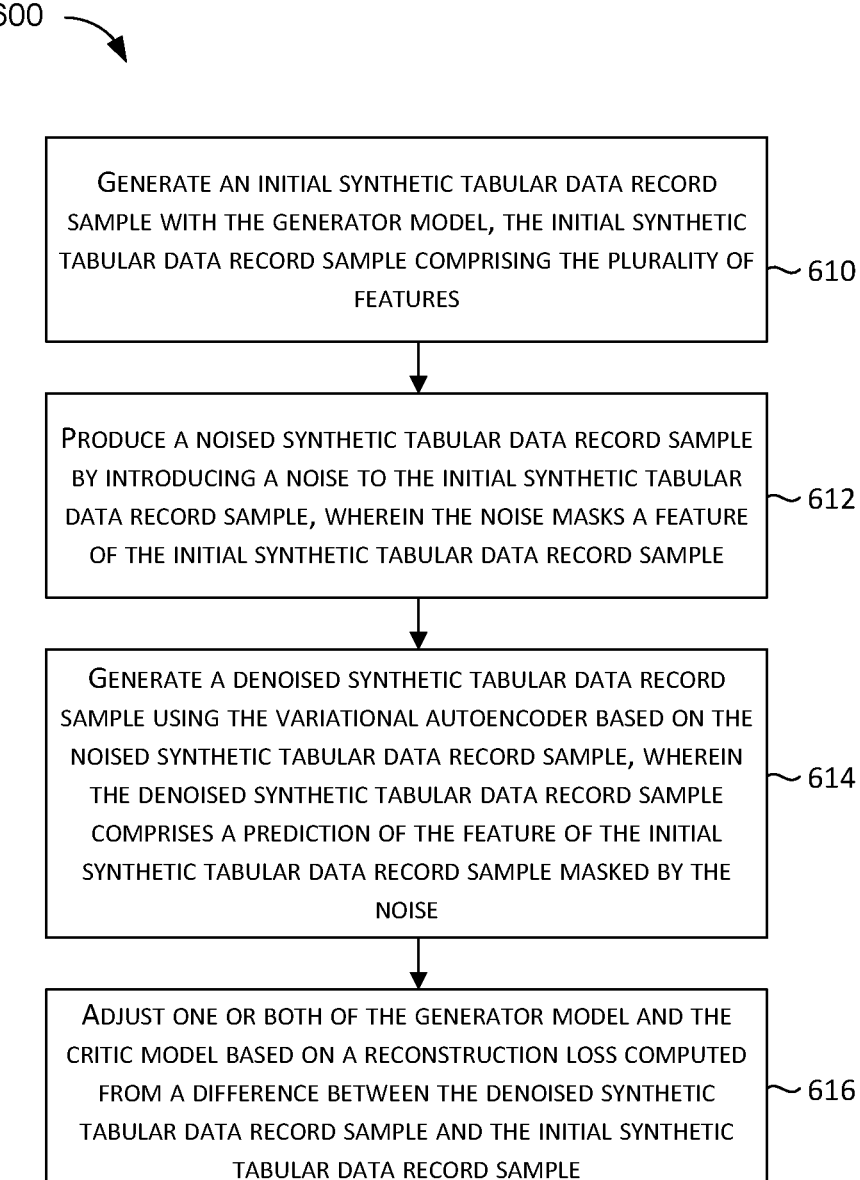

GENERATE AN INITIAL SYNTHETIC TABULAR DATA RECORD SAMPLE WITH THE GENERATOR MODEL, THE INITIAL SYNTHETIC TABULAR DATA RECORD SAMPLE COMPRISING THE PLURALITY OF FEATURES ~ 610

PRODUCE A NOISED SYNTHETIC TABULAR DATA RECORD SAMPLE BY INTRODUCING A NOISE TO THE INITIAL SYNTHETIC TABULAR DATA RECORD SAMPLE, WHEREIN THE NOISE MASKS A FEATURE OF THE INITIAL SYNTHETIC TABULAR DATA RECORD SAMPLE ~ 612

GENERATE A DENOISED SYNTHETIC TABULAR DATA RECORD SAMPLE USING THE VARIATIONAL AUTOENCODER BASED ON THE NOISED SYNTHETIC TABULAR DATA RECORD SAMPLE, WHEREIN THE DENOISED SYNTHETIC TABULAR DATA RECORD SAMPLE COMPRISES A PREDICTION OF THE FEATURE OF THE INITIAL SYNTHETIC TABULAR DATA RECORD SAMPLE MASKED BY THE NOISE ~ 614

ADJUST ONE OR BOTH OF THE GENERATOR MODEL AND THE CRITIC MODEL BASED ON A RECONSTRUCTION LOSS COMPUTED FROM A DIFFERENCE BETWEEN THE DENOISED SYNTHETIC TABULAR DATA RECORD SAMPLE AND THE INITIAL SYNTHETIC TABULAR DATA RECORD SAMPLE ~ 616

FIG. 6

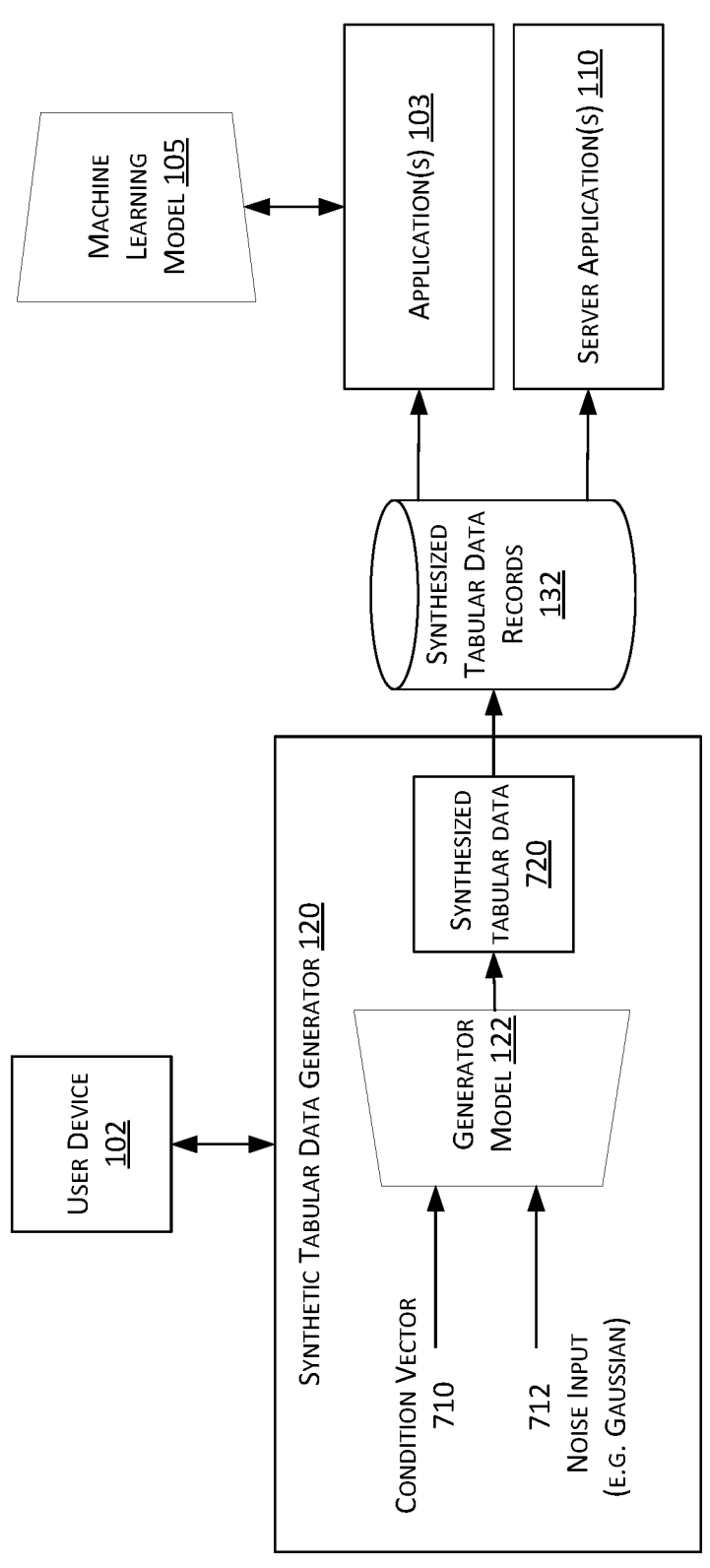
FIG. 7

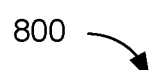

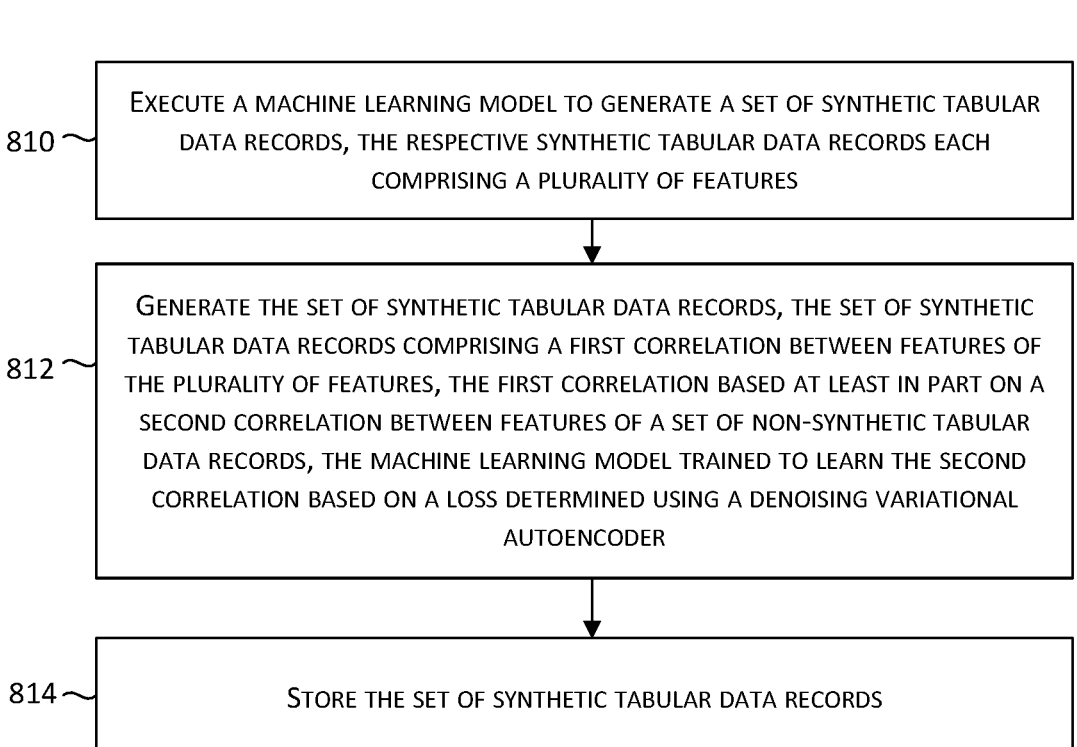

810 — EXECUTE A MACHINE LEARNING MODEL TO GENERATE A SET OF SYNTHETIC TABULAR DATA RECORDS, THE RESPECTIVE SYNTHETIC TABULAR DATA RECORDS EACH COMPRISING A PLURALITY OF FEATURES

812 — GENERATE THE SET OF SYNTHETIC TABULAR DATA RECORDS, THE SET OF SYNTHETIC TABULAR DATA RECORDS COMPRISING A FIRST CORRELATION BETWEEN FEATURES OF THE PLURALITY OF FEATURES, THE FIRST CORRELATION BASED AT LEAST IN PART ON A SECOND CORRELATION BETWEEN FEATURES OF A SET OF NON-SYNTHETIC TABULAR DATA RECORDS, THE MACHINE LEARNING MODEL TRAINED TO LEARN THE SECOND CORRELATION BASED ON A LOSS DETERMINED USING A DENOISING VARIATIONAL AUTOENCODER

814 — STORE THE SET OF SYNTHETIC TABULAR DATA RECORDS

FIG. 8

SYSTEMS AND METHODS FOR GENERATING SYNTHETIC TABULAR DATA FOR MACHINE LEARNING AND OTHER APPLICATIONS

BACKGROUND

Tabular data is data that can be represented as a table with rows representing data records, and column representing data fields for each individual record. Tabular data records are frequently used in the context of relational databases, customer relationship managed (CRM) systems, customer data platforms (CDP), and similar systems that utilize tabular data stored in relational database management systems. Machine learning models trained on tabular data have been used to perform tasks such as, but not limited to, click-through rate (CTR) prediction, user recommendation systems, customer churn prediction, fraud detection, anomaly detection, and other applications. Collecting real data to develop tabular data for training machine learning models does pose challenges with respect to privacy issues as data collected from real world sources often includes personal information that is traceable back to real people. In many jurisdictions, legislative authorities have enacted regulations that place obligations on entities that collect and/or store collected data that include such personal information. Increasingly, synthetic data is being used for training purposes in the development of machine learning and artificial intelligence technologies to avoid the challenges of collecting real data for training purposes and/or to supplement real data based training sets.

SUMMARY

The present disclosure is directed, in part, to improved systems and methods for machine learning based generation of synthetic tabular data, substantially as shown and/or described in connection with at least one of the figures, and as set forth more completely in the claims.

Embodiments presented in this disclosure provide for, among other things, a machine learning model based technologies for generating synthetic tabular data that closely replicates the inter-feature correlations found in tabular data collected from real data sources. One or more of the embodiments presented in this disclosure address the shortcomings of existing synthetic data generating techniques by taking advantage of the well-structured nature of tabular data to utilize the introduction of noise in order to learn inter-feature correlations, which is not a technique suggested by prior techniques. These embodiments involve using a variational autoencoder to learn inter-feature correlations found in tabular data collected from real data sources, and then using the trained variational autoencoder to train a generator model of a Generative Adversarial Network (GAN) to generate synthetic tabular data that exhibits the inter-feature correlation distribution found in the tabular data collected from real data sources.

The variational autoencoder is trained to learn the inter-feature correlations found in the tabular data from real data sources by introducing noise that masks features in the real tabular data. The variational autoencoder learns to infer the value of those features masked by the noise to produce denoised tabular data. In the course of this training, the variational autoencoder iteratively learns to better recognize the inter-feature correlations in order to better infer the value of the masked features. With the variational autoencoder trained, a generator model trained via a GAN framework is implicitly encoded with the inter-feature correlations learned by a variational autoencoder. Synthetic tabular data produced by the generator model thus maintains the inter-feature correlations present in the original tabular data collected from real data sources.

BRIEF DESCRIPTION OF THE DRAWINGS

The embodiments presented in this disclosure are described in detail below with reference to the attached drawing figures, wherein:

FIG. 4 is a flow chart illustrating an example method embodiment for training a generator model to generate synthetic tabular data in accordance with embodiments of the present disclosure;

FIG. 5 is a flow chart illustrating an example method embodiment for training a denoising variational autoencoder, in accordance with embodiments of the present disclosure;

FIG. 6 is a flow chart illustrating an example method embodiment for training a generator model using a GAN architecture, in accordance with embodiments of the present disclosure;

FIG. 7 is a flow diagram illustrating an example synthetic tabular data generator, in accordance with embodiments of the present disclosure;

FIG. 8 is a flow chart illustrating an example method embodiment for a synthetic tabular data generator, in accordance with embodiments of the present disclosure;

DETAILED DESCRIPTION

Figure 1:
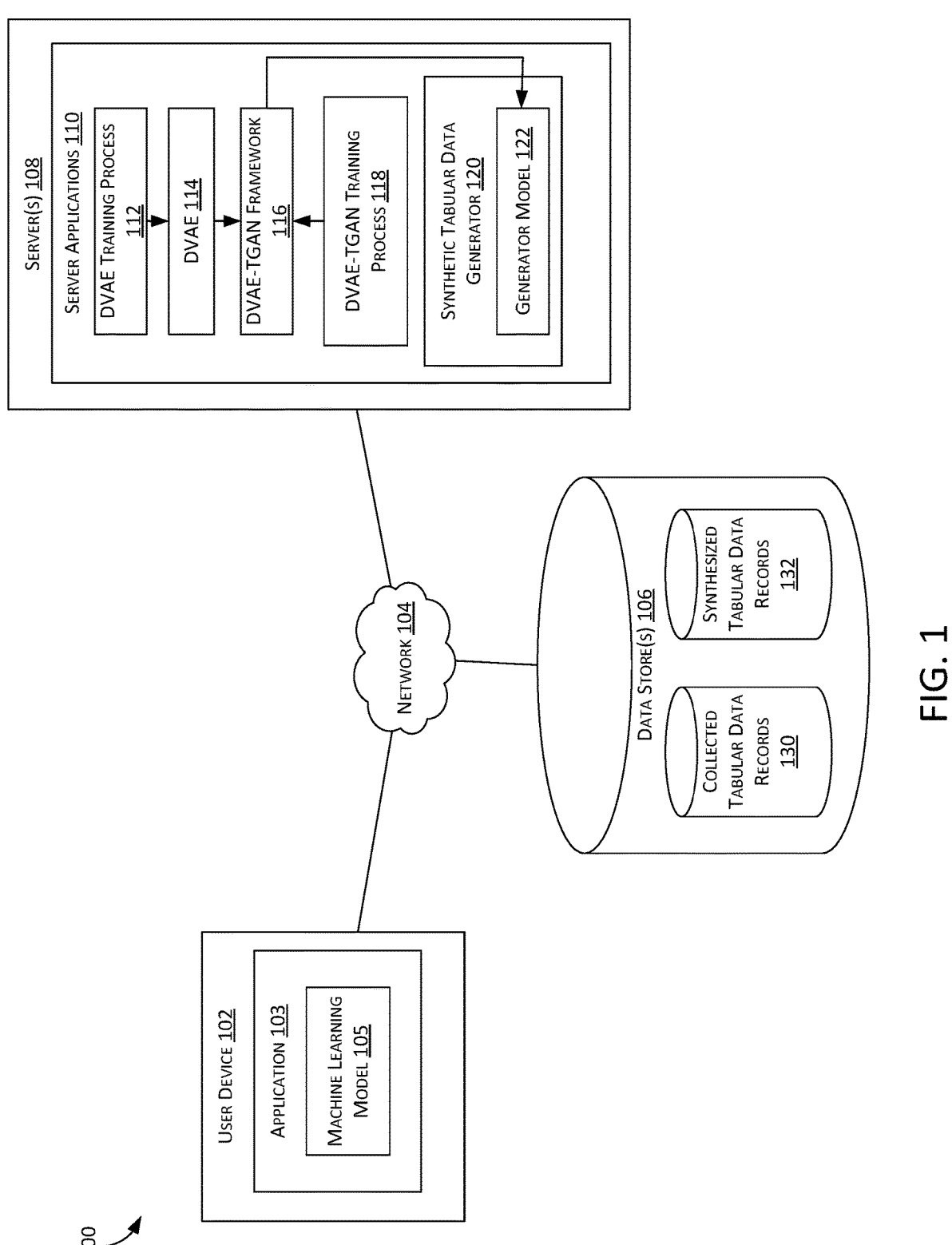
FIG. 1 is a block diagram illustrating an operating environment, in accordance with some embodiments of the present disclosure.

Embodiments of the present disclosure, at least in part, are directed to machine learning related technologies for generating synthetic tabular data that closely replicates the inter-feature correlations found in tabular data collected from real data sources. Although real tabular data collected from real data sources is used to train machine learning models that generate synthetic tabular data, the resulting synthetic tabular data does not comprise records corresponding to any real individual and therefor may be used as training data to train other machine learning models without privacy risks.

Currently, tabular data synthesis encompasses many different methods depending on the types of data. For instance, Bayesian networks and decision trees are used to generate discrete variables. A recursive modeling of tables using the Gaussian copula is used to generate continuous variables.

Techniques also exist for generating synthetic data using a Generative Adversarial Networks (GAN) trained machine learning model generator. However, existing GAN based techniques, while useful for capturing spatial correlations in image data, and semantic correlations in language data, fail to produce synthetic tabular data that is itself suitable for training other machine learning models because they inadequately account for inter-feature correlation distributions. Techniques that have been introduced specifically for using GANs to improve generating synthetic tabular data involve pre-processing generator training data to simplify data distributions, or modeling joint probability distributions of columns in a table. For example, the R'enyi generative adversarial network, RGAN, generates continuous time series healthcare records using an R'enyi loss function, MedGAN is a generative adversarial network for generating multi-label discrete patient records, and CorrGAN is a generative adversarial network for generating synthetic data by tightly bounding the influence of any individual sample on the training of the model. However, these techniques each fall short of producing synthetic tabular data suitable for training other machine learning models because they inadequately account for inter-feature correlation distributions.

One or more of the embodiments presented in this disclosure address the shortcomings of existing synthetic data generating techniques by taking advantage of the well-structured nature of tabular data to utilize the introduction of noise in order to learn inter-feature correlations, which is not a technique suggested by prior techniques. These embodiments involve using a variational autoencoder to first learn inter-feature correlations found in tabular data collected from real data sources, and then using the trained variational autoencoder to teach a generator model of a Generative Adversarial Network (GAN) to generate synthetic tabular data that exhibits the inter-feature correlation distribution found in the tabular data collected from real data sources. More specifically, the variational autoencoder is trained to learn the inter-feature correlations found in the tabular data from real data sources by introducing noise that masks features in the real tabular data. The variational autoencoder is trained to infer the value of those features masked by the noise to produce denoised tabular data. In the course of this training, the variational autoencoder iteratively learns to better recognize the inter-feature correlations in order to better infer the value of the masked features. With the variational autoencoder trained, it is integrated into a GAN between the GAN's generator model and critic model. As the generator model produces synthetic tabular data samples, noise is introduced that masks features in the synthetic tabular data, and the variational autoencoder infers the value of those noise masked features to produce denoised synthetic tabular data. The denoised synthetic tabular data is evaluated by the critic against the tabular data collected from real data sources to score the realness versus fakeness of the denoised synthetic tabular data. Losses computed both from the denoised synthetic tabular data output of the variational autoencoder, and from the score computed by the critic, are fed back to iteratively train the generator model to produce realistic synthetic tabular data. In contrast to prior techniques, a generator model trained via a GAN framework is implicitly encoded with the inter-feature correlations learned by a variational autoencoder, thus maintaining in the synthetic tabular data, the correlations present in the original tabular data collected from real data sources. Moreover, potential privacy risks of using or disclosing personal data are addressed and mitigated, because, while real collected data associated with real individuals is potentially included in the processes of training the variational autoencoder, the synthesized tabular data records generated by the generator model merely emulate correlations learned from the real data, but do not include tabular data records traceable back to any specific real person.

The embodiments presented herein enable the implementation of improved computer based technologies that produce high quality synthetic tabular data that is indistinguishable from collected tabular data, and therefore may be used in place of, or to supplement, collected tabular data for machine learning model training and other tasks. For example, collecting real tabular data is costly in terms of expense and computing resources to collect and store, and the number of collected tabular data records may be inadequate to complete the training of a machine learning model for a desired task. When a shortfall in the availability of tabular data records is identified, additional time and computing resources may need to be incurred to further gather the additional training data needed. Existing technologies do not adequately account for inter-feature corrections within tabular data and therefore do not generate synthetic training data suitable for training machine learning models to perform inference tasks or similar machine learning solutions. The embodiments presented herein enable the realization of a synthetic tabular data generator that does account for inter-feature corrections and that may be accessed from other computing devices, for example as an on-demand service via a cloud based platform, to generate realistic synthetic tabular training data, representing a substantially more efficient technology for obtaining tabular training data.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments can be utilized and that logical, mechanical and electrical changes can be made without departing from the scope of the present disclosure. The following detailed description is, therefore, not to be taken in a limiting sense. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Turning to FIG. 1, FIG. 1 depicts an example configuration of an operating environment 100 in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities are be carried out by hardware, firmware, and/or software.

For instance, in some embodiments, some functions are carried out by a processor executing instructions stored in memory as further described with reference to FIG. 9, or within a cloud computing environment as further described with respect to FIG. 10.

It should be understood that operating environment 100 shown in FIG. 1 is an example of one suitable operating environment. Among other components not shown, operating environment 100 includes a user device, such as user device 102, network 104, a data store 106, and one or more servers 108. Each of the components shown in FIG. 1 can be implemented via any type of computing device, such as one or more of computing device 900 described in connection to FIG. 9, or within a cloud computing environment 1000 as further described with respect to FIG. 10, for example. These components communicate with each other via network 104, which can be wired, wireless, or both.

One or more of the embodiments described in this disclosure take advantage of the well-structured nature of tabular data to utilize the introduction of noise in order to learn inter-feature correlations, which is not a technique suggested by prior techniques. The synthetic tabular data generator illustrated in FIG. 1 includes a generator model that is encoded with the inter-feature correlations learned by a denoising variational autoencoder, thus maintaining in the synthetic tabular data, the correlations present in the original tabular data collected from real data sources.

For example, a user of user device 102 can execute an application 103 that uses tabular data records as an input for one or more tasks. For example, the application 103 can comprise a training algorithm for training a machine learning model 105 that uses tabular data records for training and testing of the machine learning model 105. As examples, the machine learning model 105 can be used in the context of customer relationship managed (CRM) system, a customer data platform (CDP), a relational database management system, and/or other system that utilize tabular data. Although the application 103 could potentially use collected tabular records 130 available from data store(s) 106 for this purposes, as discussed above, collected tabular data records 130, particularly when collected from multiple sources, tend to be incomplete, noisy, and under-balanced with respect to feature distributions, rendering such data inadequate for training a machine learning model 105 to perform, for example, feature inference or prediction tasks. Moreover, because collected tabular data records 130 is costly in terms of costs, time, equipment, and computing resources, to collect, the number of tabular data records available from the collected tabular records 130 may be inadequate to complete the training of machine learning model 105 for a desired task. Then, when a shortfall in the availability of tabular data records is identified, additional time, effort, resources, and expenses, may need to be incurred to further gather the additional training data needed. Accordingly, the user of user device 102 can instead turn to using synthesized tabular data records 132 as input to the application 103 (e.g., for training machine learning model 105). Synthesized tabular data records 132 can be used in place of using collected tabular records 130, or to supplement (e.g., in combination with) collected tabular records 130. As explained in greater detail within, in some embodiments, the application 103 interfaces with an embodiment of the synthetic tabular data generator 120 described herein to request a specified quantity of records of synthesized tabular data records 132. In some embodiments, the application 103 further specifies one or more options that are used by the synthetic tabular data generator 120 to create condition vectors in order to customize characteristics of the records of synthesized tabular data records 132 generated.

In the embodiments described herein, the synthetic tabular data generator 120 comprises a machine learning model generator (shown as generator model 122) trained using a denoising variational autoencoder-tabular generative adversarial network (DVAE-TGAN) framework 116. The DVAE-TGAN framework 116 is trained to generate tabular data records that are realistic as compared to the collected tabular records 130, including preservation of inter-feature correlations within individual synthetic tabular data records. As shown in FIG. 1, in some embodiments, the server(s) 108 executes a plurality of server applications 110, including the synthetic tabular data generator 120. In FIG. 1, server applications 110 include a denoising variational autoencoder training processes 112 that is executed to train a denoising variational autoencoder 114. The denoising variational autoencoder 114 is trained by denoising variational autoencoder training processes 112 using tabular data records (e.g. from collected tabular data records 130) that are partially corrupted by the introduction of noise, to predict the value of features masked by the noise in order to reproduce the original tabular data records reflecting the value of features as they were in the original tabular data records before the noise was introduced. While learning to denoise the corrupted tabular data records, the denoising variational autoencoder 114 ultimately also learns the multivariant inter-feature correlations present between the features of the collected tabular data records 130. Then, using the trained denoising variational autoencoder 114, the generator model 122 is trained using a DVAE-TGAN training process 118, which can be implemented as a server application 110 executed by the servicer(s) 108. The generator model 122 is trained to operate as a conditional generative network by the DVAE-TGAN framework 116 using an adversarial principle to produce synthesize tabular data records 132 that are realistic in that they preserve multivariant inter-feature correlations and other characteristics exhibited by the collected tabular data records 130. The synthesize tabular data records 132 can be used by application 103 to efficiently train machine learning model 105 and/or perform other tasks such as, but not limited to, performing simulations and/or beta testing of applications or systems. Moreover, potential privacy risks of using or disclosing personal data are addressed and mitigated, because, while the real data associated with real individuals captured in the collected tabular data records 130 is used in the process that produces the generator model 122, the synthesized tabular data records 132 themselves merely emulate correlations observable from the collected tabular data records 130, but do not include tabular data records associated with any specific real person.

It should be understood that any number of user devices, servers, and other components are employed within operating environment 100 within the scope of the present disclosure. Each component comprises a single device or multiple devices cooperating in a distributed environment. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) to provide wireless connectivity. Networking environments are commonplace in offices, enterprise-wide computer networks, intranets, and the Internet. Accordingly, network 104 is not described in significant detail.

The user device 102 can be any type of computing device capable of being operated by a user. For example, in some implementations, user device 102 is the type of computing device described in relation to FIG. 9. By way of example and not limitation, a user device is embodied as a personal computer (PC), a laptop computer, a mobile device, a smartphone, a tablet computer, a smart watch, a wearable computer, a headset, an augmented reality device, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device. Application 103 is referred to as a single application for simplicity, but its functionality can be embodied by one or more applications in practice. In some implementations, the application 103 comprises a web application, which can run in a web browser, and could be hosted at least partially on the server-side of environment 100 (such as by server applications 108). It is therefore contemplated herein that "application" be interpreted broadly. The user device 102 and/or servers 108 can include one or more processors, and one or more computer-readable media. The computer-readable media includes computer-readable instructions executable by the one or more processors. The instructions are embodied by one or more applications, such as application 103 and/or server applications 110 shown in FIG. 1. In some embodiments, one or more functions of the server applications 110 discussed herein are implemented on the user device 102, on the server(s) 108, or in a distributed form across both the user device 102 and server(s) 108.

Figure 2A:
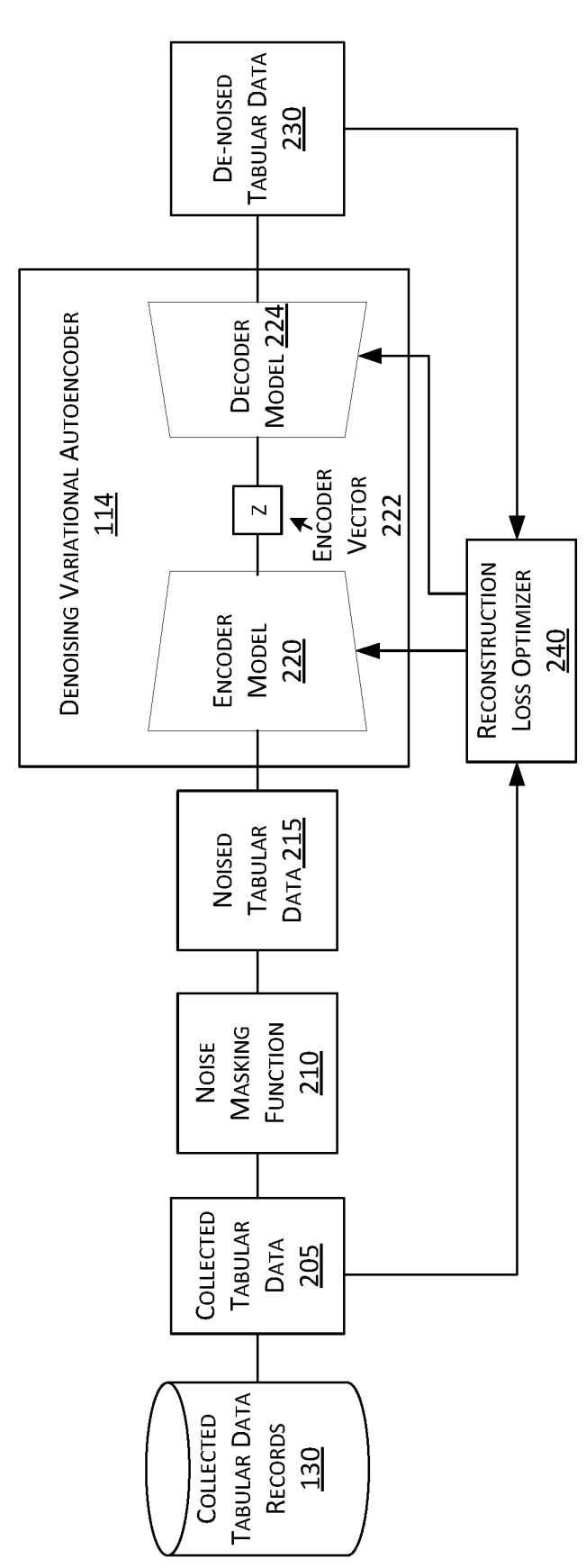
FIG. 2A is a data flow diagram illustrating a training process for a denoising variational autoencoder in accordance with some embodiments of the present disclosure.

Referring now to FIG. 2A, FIG. 2A is a data flow diagram illustrating the DVAE training process 112 for training a denoising variational autoencoder 114, such as shown in FIG. 1. In embodiments such as shown in FIG. 2A, denoising variational autoencoder 114 is a machine learning model that comprises the combination of an encoder model 220 and a decoder model 224. The encoder model 220 and decoder model 224 are implemented using one or more machine learning models such as a recurrent neural network (RNN) or other form of neural network. In general, the denoising variational autoencoder 114 is an architecture that inputs records of tabular data into the encoder model 220, compresses the data into an encoded fixed-length representation in the form of an encoder vector 222, and processes the encoder vector 222 with the decoder model 224 to reconstruct a representation of each tabular data record that was provided as input into the encoder model. In some embodiments, an encoder vector 222 represents a set of stochastic latent embeddings for a tabular data record processed by the encoder model 220. For example, the encoder vector 222 represents a final hidden state produced from the encoder model 220 part of the denoising variational autoencoder 114 that encapsulate the features of the input tabular data records in order to help the decoder model 224 make accurate reconstructions. In some embodiments, the encoder vector 222 functions as an initial hidden state of the decoder model 224.

As shown in FIG. 2A, the DVAE training process 112 trains the denoising variational autoencoder 114 to not merely produce an output tabular data record that reconstructs an equivalent of an input tabular data record, but to repair damage introduced to tabular data records by a noise masking function 210. More specifically, the noise masking function 210 receives one or more record samples of collected tabular data 205 and introduces noise that masks one or more features in each record of the collected tabular data 205 to produce noised tabular data 215.

Figure 2B:
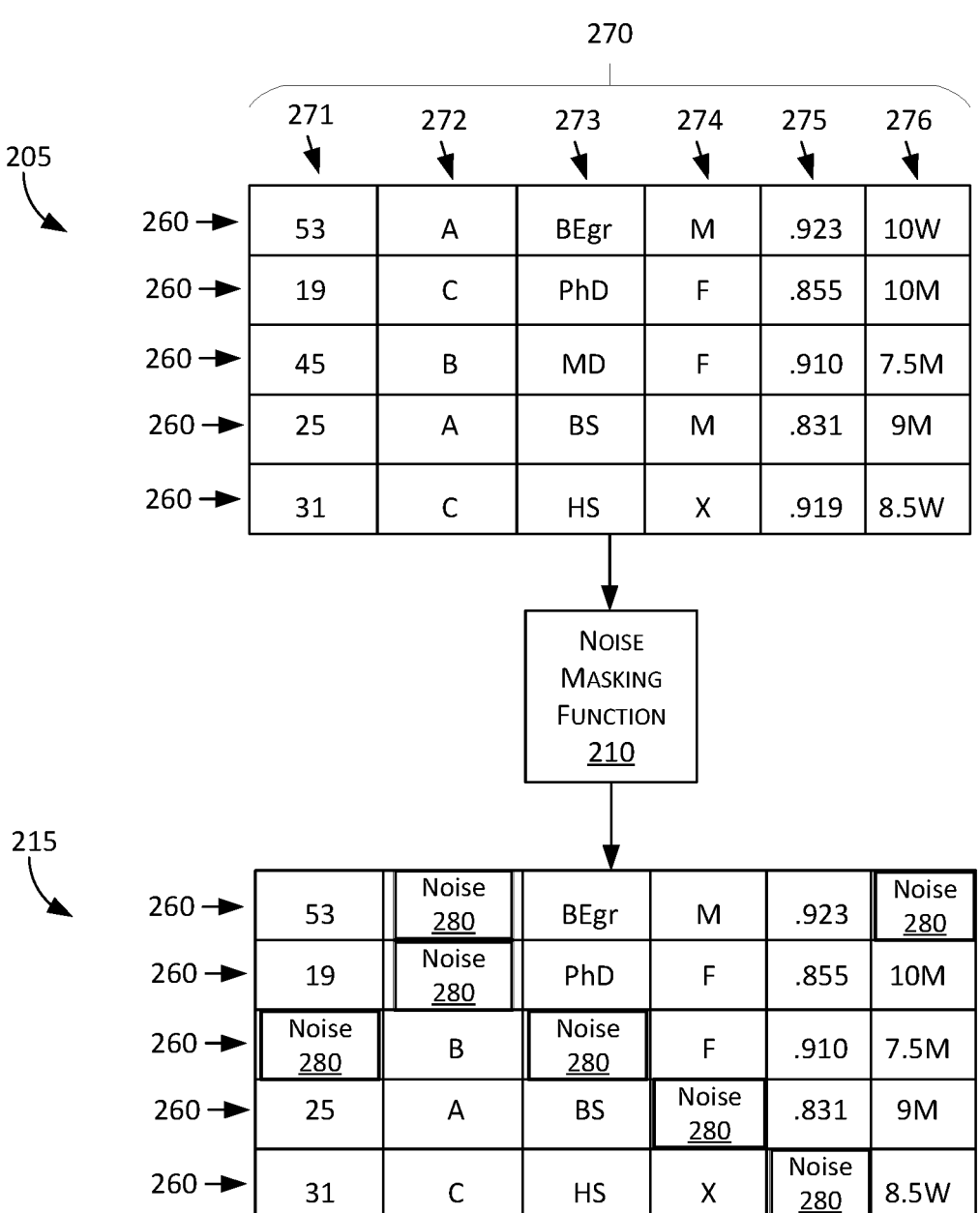
FIG. 2B is a diagram illustrating introduction of noise masking features of tabulated data records, in accordance with some embodiments of the present disclosure.

As shown in FIG. 2B collected tabular data 205, in some embodiments, comprises a tabular data format wherein each row of the collected tabular data 205 define a single tabular data record 260 and each of the columns 270 corresponds to an individual feature (shown as features 271, 272, 273, 274, 275 and 276), where each feature is an individual property or attribute something (or someone) associated with a record 260. The feature values that populate the set of features (271-276) for each record thus describes characteristic of object (such as a person, for example) associated with that particular record. Feature values can be continuous variables (e.g., numeric values and/or other continuous ordered information) and/or discrete values (e.g., categorical, class, and/or other feature information that can only assume certain values). Although the collected tabular data 205 illustrates tabular data records 260 as each comprising six features (271-276) it should be understood that collected tabular data 205 can be structured with tabular data records 260 that include any number of records. Moreover it should be understood that in the collected tabular data 205, being based on the collection of real data, one or more records 260 may be incomplete with respect to one or more of the features having null or default values.

As further shown in FIG. 2B, the collected tabular data 205 is corrupted by the noise masking function 210, which introduces noise elements (shown as noise 280) that mask the values of one or more features in each tabular data record 260. In some embodiments, noise 280 is applied to mask features randomly and/or based on a predefined probability distribution. In some embodiments, the noise masking function 210 sets a maximum threshold with respect to the maximum number of features masked by noise 280 in any one record 260. In some embodiments the maximum threshold is based on a function of the number of features each record 260 includes. For example, in some embodiments, the noise masking function 210 randomly introduces noise 280 to mask one or more features, but no more than a maximum percentage (e.g. 30%) defined by the maximum threshold. In other embodiments, a threshold for limiting the application of noise 280 may be based on other criteria. As discussed below, because the masking of features with noise 280 is random, over the course of training, the denoising variational autoencoder 114 learns the intra-feature correlations between different sets of the features (271-276).

Returning to FIG. 2A, the encoder model 220-decoder model 224 pair of the denoising variational autoencoder 114 is trained to predict the values of masked features in each record of noised tabular data 215 to produce a de-noised reconstruction of records of the collected tabular data 205 as they were prior to the introduction of the noise 280 by the noise masking function 210, and generate de-noised tabular data 230 comprising those reconstructed tabular data records. In some embodiments, the encoder model 220 and decoder model 224 are trained together. A reconstruction loss function is computed by a reconstruction loss optimizer 240 based on the differences between the original collected tabular data 205 and the de-noised tabular data 230. The reconstruction loss optimizer 240 iteratively adjusts both encoder model 220 and decoder model 224 using the reconstruction loss as feedback to reduce the reconstruction loss, thus improving the ability of the denoising variational autoencoder 114 to produce de-noised tabular data 230 that preserves the inter-feature correlations found in the collected tabular data records 130.

In some embodiments, the encoder model 220 inputs a record of noised tabular data 215 as a data sample, y, and encodes that record to a latent representation, z, in the form of the encoder vector 222. The decoder model 224 decodes and de-noises that latent representation in encoder vector 222 back into a data space in the form of a record of de-noised tabular data, ŷ, which may be expressed as:

$$z \sim Enc(y) = q(z \mid y),$$

$$\hat{y} \sim Dec(z) = p(x \mid z).$$

The denoising variational autoencoder 114 can regularize the encoder model 220 by imposing a prior over the latent distribution p (z). That is, the denoising variational autoencoder 114 imposes a constraint on this latent distribution forcing it to be a normal distribution to ensure that the latent space is regularized. For example, in some embodiments, z $\sim \mathcal{N}$ (0, I) is chosen. The loss for a prediction (e.g., a record of the de-noise tabular data 230) can be expressed in terms of a minus of the sum of an expected log-likelihood (e.g., the reconstruction error) and a prior regularization term as:

$$-\mathbb{E}_{q(z|y)}\left[\ln\frac{p(y, z)}{q(z \mid y)}\right] = KL(q(z \mid y) \mid p(z)) - \mathbb{E}_{q(z|y)}[\ln p(y \mid z)]$$

where $\mathbb{E}$ denotes the expectation, KL refers to the Kullback-Leibler divergence and q(z|y), p(y|z) and p(z) refer to the encoder, decoder and prior, respectively. In embodiments, the denoising variational autoencoder 114 further introduces an additional conditional probability p(y'|y) representing a noise model for implementing the noise masking function 210 (e.g., where y' is the noised record of tabular data derived from y). The evidence lower bound (ELBO) for reconstruction loss in the case where noise 280 is introduced to mask features can be written as:

$$\mathbb{E}_{\tilde{q}(z|y)}\left[\ln\frac{p(y, z)}{\tilde{q}(z \mid y)}\right] = \mathbb{E}_{\tilde{q}(z|y)}\left[\ln\frac{p(y \mid z)}{\mathbb{E}_{q}(y' \mid y)_{[q(z|y')]}}\right].$$

The denoising variational autoencoder 114 is thus adaptable to reconstruct tabular data that was corrupted using noise 280 introduced to mask features in the real collected tabular data. The denoising variational autoencoder 114 learns to reconstruct the original feature values of the clean tabular data 205 (e.g., by maximizing the expected log-likelihood) given the corrupted input of noised tabular data 215. As discussed above, in some embodiments, the noise masking function 210 masks the features of one or more randomly chosen columns of the tabular data 205 and the denoising variational autoencoder 114 reconstructs the entire tabular data record. In this way the denoising variational autoencoder 114 learns the correlations between the corrupted features and noncorrupted features. Since the choice of feature(s) to corrupt is random at each training iteration, the denoising variational autoencoder 114 learns complex interactions and relationships across columns (and thereby across features) in the tabular data.

As previously mentioned, collections of real-world tabular data can sometimes present challenges to tabular data generation, such as mixed-type variables, irregular distribution (e.g., non-Gaussian distribution), and multimodality. For example, a non-Gaussian distribution of continuous variables can cause gradient vanish issues when they are min-max normalized during GAN training. That is, mode collapse issues affecting conventional image GANs can also occur to tabular data generation where features represented in the data as continuous variables sometimes are multimodal. To overcome the problems raised by the complex distribution of a continuous variable, in some embodiments, the DVAE training process 112 applies mode-specific normalization to continuous variables of the tabular data 205 input to produce the noised tabular data 215. For example, in some embodiments, mode-specific normalization first fits a variational Gaussian mixture model (VGM) for the columns of the tabular data 205 that include features expressed by continuous variables. For a fitted VGM of a column of n Gaussian components, a single feature value from this column can be encoded as a vector of length n+1. The first n elements denote a one-hot vector indicating the most likely Gaussian component that the value belongs to. The last (e.g., n+1st) element of the one-hot vector can be the mean and variance normalized value of the corresponding Gaussian component. One-hot encoding can also be used to encode the value of featured represented by discrete variables.

Figure 3:
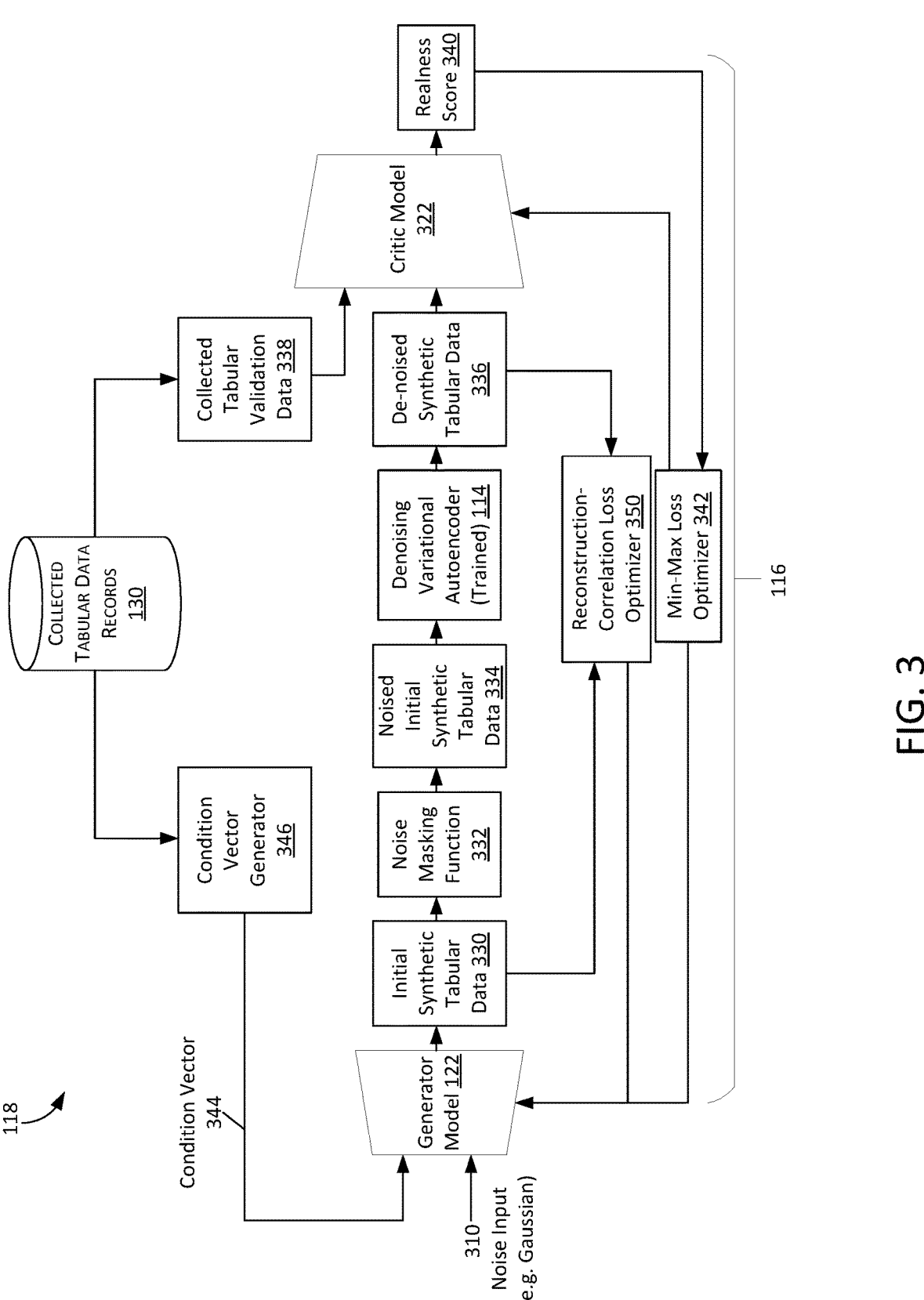
FIG. 3 is a data flow diagram illustrating a generative adversary network (GAN) architecture for training a generator model, in accordance with some embodiments of the present disclosure.

Referring now to FIG. 3, FIG. 3 is a data flow diagram illustrating the DVAE-TGAN training process 118 for training the generator model 122 of the synthetic tabular data generator 120, such as shown in FIG. 1. In the embodiment of FIG. 3, the DVAE-TGAN framework 116 is implemented using a generative adversary network (GAN) architecture comprising the generator model 122, a critic model 322, and the trained denoising variational autoencoder 114 (e.g., previously trained using the DVAE training process 112 shown in FIG. 2) coupled between the generator model 122 and the critic model 322. During training of the DVAE-TGAN framework 116, the generator model 122 and the critic model 322 engage in a two-play zero-sum task where the generator model 122 iteratively learns to generate more realistic synthetic tabular data, and the critic model 322 iteratively learns how to better discern synthetic tabular data from real (e.g., collected) tabular data. Training can continue, for example, until the generator model 122 achieves an optimal generation quality and the critic model 322 cannot distinguish between real tabular data and synthetic tabular data. The GAN loss function used for training is often referred to as a min-max loss function, which in some embodiments is computed by a min-max loss optimizer 342. Over the course of training iterations, the generator model 122 attempts to minimize the loss computed by this min-max loss function while the critic model 322 tries to maximize it.

As the DVAE-TGAN framework 116 is being trained, the generator model 122 is fed a noise input 310 comprising samples of random noise (e.g., from a Gaussian noise distribution) and produces an output, referred to herein as initial synthetic tabular data 330 from that noise input 310. In some embodiments, the generator model 122 further receives a condition vector 334 as input, which is further discussed in detail below. The generator model 112 is trained to produce initial synthetic tabular data 330 that comprises the same tabular structure as the collected tabular data 205 used to train the denoising variational autoencoder 114. That is, each records of the initial synthetic tabular data 330 comprise the same tabular features as records of the collected tabular data 205. By training the generator model 122 together with the critic model 322, the DVAE-TGAN framework 116 eventually converges on a deterministic transformation in the generator model 122 that maps the noise input 310 into a distribution in the form of the initial synthetic tabular data 330. The denoising variational autoencoder 114 is integrated within the process flow of the DVAE-TGAN framework 116 after the generator model 122 and prior to the critic model 322. The denoising variational autoencoder 114 was previously trained to reconstruct corrupted collected tabular data, and in that process learned the inter-feature correlations between different features (e.g., in the different columns) as they exist in the collected tabular data records 130. The DVAE-TGAN framework 116 exploits the training of the denoising variational autoencoder 114 to transfer the learned information about the properties of the collected tabular data records 130 (such as the inter-feature correlations) into feedback, in the form of loss functions, that teach the generator model 122 to produce synthetic tabular records for the initial synthetic tabular data 330 that the critic model 322 finds increasingly difficult to distinguish from real tabular data records in the collected tabular data records 130.

More specifically, as shown in FIG. 3, the DVAE-TGAN training process 118 includes a noise masking function 332 that receives one or more record samples of the initial synthetic tabular data 330 and introduces noise that masks one or more features in each record of the initial synthetic tabular data 330 to produce noised initial synthetic tabular data 334 (e.g., performing the same function to introduce noise in the same way as the noise masking function 210 introduces noise 280 as discussed above with respect to FIG. 2). The noised initial synthetic tabular data 334 is fed as input to the denoising variational autoencoder 114. The denoising variational autoencoder 114, per its training, generates records of denoised synthetic tabular data 336 that include inferred values (e.g., predictions) for the values of features that were masked by the noise masking function 332. Because the denoising variational autoencoder 114 is trained as described above, as the denoising variational autoencoder 114 infers replacements values for the masked features, it will do so in a manner that preserves the inter-feature correlations that it learned during its training. In other words, within the context of the DVAE-TGAN framework 116 the denoising variational autoencoder 114 is not directly attempting to reproduce the initial synthetic tabular data 330 using the noised initial synthetic tabular data 334, but rather is attempting to impose the inter-feature correlations appearing in the collected tabular data records 130 onto for each record of the noised initial synthetic tabular data 334. The denoising variational autoencoder 114 achieves this task through the reconstruction of values for those features masked by the noise masking function 332, based on the learned inter-feature correlations. The denoising variational autoencoder 114 outputs those reconstructed tabular data records, which are saved as the denoised synthetic tabular data 336. The denoised synthetic tabular data 336, in turn, are used for computing reconstruction and generator losses for adjusting the generator model 122 and critic model 322 of the DVAE-TGAN framework 116 as further explained below.

As shown in FIG. 3, in some embodiments, the denoised synthetic tabular data 336 is fed as input to the critic model 322, along with collected tabular validation data 338 that comprise samples of tabular data records from the collected tabular data records 130. The denoised synthetic tabular data 336 and collected tabular validation data 338 are processed by the critic model 332 to generate a realness score 340 that represents assessment of the critic model 332 as to whether the denoised synthetic tabular data 336 is real tabulated data as opposed to synthetic tabulated data. In some embodiments, a generator loss is calculated by the min-max loss optimizer 342 from the critic model's realness score 340 where the generator model 330 gets rewarded (e.g., loss is decreased) when the denoised tabular data 336 successfully fools the critic model 332, and gets penalized (e.g., loss is increased) when the denoised tabular data 336 does not successfully fool the critic model 332. In some embodiments, the critic model 322 is also simultaneously trained (e.g., by the min-max loss optimizer 342) as a function of the realness scope 340 an is penalized for misidentifying a real tabular data record as synthetic, or a synthetic tabular data record as real.

In some embodiments, the generator model 122 and critic model 322 are implemented within the DVAE-TGAN framework 116 as a Wasserstein GAN, that seeks to train the generator model 122 to generate initial synthetic tabular data 330 that approximates a distribution of data observed in the collected tabular data records 130. The critic model 332 computes a score 340 indicating a predicted realness of the denoised tabular data 336 based on the inputs of the denoised tabular data 336 and the collected tabular validation data 338. The DVAE-TGAN training process 118, based on the score 340, can compute what is referred to as an earth mover distance, or Wasserstein distance, that measures the distance between the data distribution observed across a plurality of records in the collected tabular validation data 338, and a plurality of records in the denoised synthetic tabulate data 336, to train the DVAE-TGAN framework 116. In some embodiments, the critic model 332 determines a distribution of features across multiple records of the collected tabular validation data 338 and a distribution of features across the denoised synthetic tabulate data 336 (e.g. a sample of 100 records of collected tabular validation data 338 and a sample of 100 records of denoised synthetic tabulate data 336) to compare the distribution of features over these samples and the min-max loss optimizer computes a feedback min-max loss (e.g., a Wassersten loss) that the critic model 322 attempts to maximize and the generator model 122 is trying to minimize. For example, in some embodiments, a min-max loss can be computed by the min-max optimizer 342 based on the model:

$$\min_{G} \max_{D} \mathbb{E}_{x \sim p_x}[D(x)] - \mathbb{E}_{z \sim p_z}[D(G(x))] - \lambda \mathbb{E}[D(\hat{x})]$$

where $p_z$ is a prior distribution; $p_x$ is a distribution of data, G is a generator function for generator model 122, D is a discriminator function for critic model 322 (e.g. a Wasserstein critic function), and $\hat{x}$ is a randomly weighted combination of G(z) and x. The critic model 322 provides feedback on the quality of the generation of the de-noised synthetic tabular data 336. In some embodiments, $p_g$ denotes a distribution of synthetic data induced by the function G(z) from $p_z$, and $p_{\hat{x}}$ denotes a distribution created after the random combination. For example, N(0, 1) can be used for the prior $p_z$. By training the generator model 122 together with the critic model 322, the generator model 112 eventually learns a deterministic transformation that maps the standard noise input 31 into the distribution of the initial synthetic tabular data 330.

As shown in FIG. 3, the DVAE-TGAN framework 116 includes a generator loss feedback to the generator model 112 computed by a reconstruction-correlation loss optimizer 350, which comprises one or both of a reconstruction loss component and a correlation loss component.

The reconstruction loss ($\mathcal{L}_r$) is directed to a feedback to the generator model 122 that is derived at least in part from the output of the denoising variational autoencoder 114. Since the denoising variational autoencoder 114 has already learned the inter-feature correlations from the original data distribution of the collected tabular data records 130, the denoising variational autoencoder 114 preserves those inter-feature correlations when filling in the corrupted variables of the noised initial synthetic tabular data 334 with values that would correlate with the un-corrupted values in the original collected tabular data records 130. In some embodiments, a reconstruction loss function can be computed by the reconstruction-correlation loss optimizer 350 based on differences between the initial synthetic tabular data 330 and the denoised synthetic tabular data 336, training the generator model 122 to produce initial synthetic tabular data 330 having inter-feature correlations that are more consistent with the de-noised synthetic tabular data 336. The reconstruction-correlation loss optimizer 350 iteratively adjusts the generator model 122 using the reconstruction loss ($\mathcal{L}_r$) as feedback, thus improving the ability of the generator model 122 to produce initial synthetic tabular data 330 that preserves the inter-feature correlations found in the collected tabular data records 130. This reconstruction loss ($\mathcal{L}_r$) thus passes onto the generator the learnt implicit inter-variable relations, including the intra-feature correlations, from the denoising variational autoencoder 114. In some embodiments, the reconstruction loss ($\mathcal{L}_r$) can be mathematically expressed as:

$$\mathcal{L}_r = \mathbb{E}_{q(z|y_{synthetic})}\left[\ln\frac{p(y_{synthetic}, z)}{\mathbb{E}_{q(y'_{synthetic}|y_{synthetic})}[q(z|y'_{synthetic})]}\right]$$

where $y_{synthetic}$ is the initial synthetic tabular data 330 output of the generator model 122 and $y'_{synthetic}$ is the noised initial synthetic tabular data 334 noisy sample derived from $y_{synthetic}$ by the noise masking function 332. Reconstruction loss ($\mathcal{L}_r$) thus helps to preserve semantic integrity, and penalizes synthesized records where the combination of values are semantically incorrect. For instance, a synthetic tabular data record where the feature of "City" has the value of "Bangalore", and the feature of "Country" has the value of "United Stated" is not a semantically correct record as "Bangalore" is not a city in the country of "United States", and no such record should appear in the original collected tabular data records and hence would not be an inter-variable relation learned by the denoising variational autoencoder 114.

The correlation loss ($\mathcal{L}_c$) is directed to a feedback to the generator model 122 that penalizes for discrepancies between inter-variable correlations between the continuous data columns of the generated data and the real data. In some embodiments, to compute the correlation loss ($\mathcal{L}_c$), a Person product-moment correlation coefficient matrix is determined by the reconstruction-correlation loss optimizer 350. The correlation loss ($\mathcal{L}_c$), in some embodiments, is thus computed from multiple rows (e.g., multiple records) of collected and synthetic tabular data. For example, a correlation coefficient matrix, R, of r records of tabular data is computed between columns i and j using the covariance matrix C as given by:

$$R_{ij} = \frac{C_{ij}}{\sqrt{C_{ii} * C_{jj}}}$$

where the index "i" references the $i^{th}$ feature (e.g., column) in a collected tabular data record of from a set of real records (e.g., from the collected tabular validation data 338), and the index "j" references the $j^{th}$ feature (e.g., column) in a synthetic tabular data record (e.g., from the de-noised synthetic tabular data 336). This correlation coefficient matrix, R, is calculated by the reconstruction-correlation loss optimizer 350 for both collected and synthetic tabular data record samples, and the correlation loss ($\mathcal{L}_c$) is computed to be the difference between these matrices and fed back to train the generator model 122 to generate initial synthetic tabular data 330 that is statistically closer to the real data from the collected tabular data records 130. For example, correlation loss ($\mathcal{L}_c$) can be computed from:

$$\mathcal{L}_c = \sum_{i,j}\left\|R_{ij}^{collected} - R_{ij}^{synthetic}\right\|$$

Also as shown in FIG. 3, in some embodiments, the generator model 122 further inputs a condition vector 344 which is used to apply conditions to the initial synthetic tabular data 330 output generated by the generator model 122. In a collection of real collected tabular data, there may be features where certain values for those features rarely occur. In order to train the generator model 122 to produce synthetic tabular data records based on the whole spectrum of possible feature combinations, the condition vector 344 is used to inform the training of the generator model 122. In some embodiments, the condition vector 344 takes the form of a one-hot vector denoting the value of a feature that should appear in the initial synthetic tabular data 330 that the generator model 122 produces during training. In some embodiments, the condition vector 334 can be defined as follows:

$$c = c_1 \oplus c_2 \oplus \ldots \oplus c_{N_D}$$

where $c_i$ is either a zero vector or a random one-hot vector of a discrete column for a selected feature. In some embodiments, the condition vector generator 346 determines $s \in \{1, 2, \ldots, N_D\}$ and $c_s$ is a random one-hot vector while for all other $i \neq s$, $c_i$ is a zero vector. In other words, the condition vector generator 346 specifies a discrete value in the $s^{th}$ discrete column for a tabular data record, and provide the initial input $z \oplus c$, to feed into the generator model 122 to generate the initial synthetic tabular data 330. For example, if possible values for a feature in column i of a tabular data record has the three possible values of A, B, and C, then a one-hot vector for $c_i$ may have the value [1,0,0] to represent the "A", [0,1,0] to represent "B", [0,0,1] to represent "C". A condition vector 344 having $c_i$ of [1,0,0] would condition the generator model 122 to generate records of initial synthetic tabular data 330 where the column i (corresponding to the conditioned feature) has the value "A". Similarly, a condition vector 344 having $c_i$ of [0,1,0] would condition the generator model 122 to generate records of initial synthetic tabular data 330 where the column i has the value "B", and a condition vector 344 having $c_i$ of [0,0,1] would condition the generator model 122 to generate records of initial synthetic tabular data 330 where the column i has the value "C". A condition vector 344 having $c_i$ of zero (e.g., [0,0,0])

would indicate to the generator model 122 that no condition is being placed on the generation of the value for column i.

In some embodiments, the condition vector generator 346 generates the condition vector 344 proportional to the frequency of the data in the collected tabular data records 130. For example, if a certain value of a feature occurs in the collected tabular data records 130 occurs n % of the time, then the condition vector generator 346 produces a condition vector 344 that conditions the condition vector generator 346 to produce a set of initial synthetic tabular data 330 where the column for that feature has that value approximately n % of the time. In some embodiments, the generator model 122 is trained using the DVAE-TGAN framework 116 over a plurality of sessions where in each session the condition vector 344 is selected to fine-tune the training with respect to a probability distribution of possible values for a set of one or more selected features.

FIG. 4 is a diagram illustrating a method for generating synthetic tabular data in accordance with an example embodiment. It should be understood that the features and elements described herein with respect to the method 400 of FIG. 4 can be used in conjunction with, in combination with, or substituted for elements of, any of the other embodiments discussed herein and vice versa. Further, it should be understood that the functions, structures, and other descriptions of elements for embodiments described in FIG. 4 can apply to like or similarly named or described elements across any of the figures and/or embodiments described herein and vice versa. In some embodiments, elements of method 400 are implemented using one or more elements of the operating environment 100 disclosed above, and executed as operations by one or more processing device.

The method 400 at 410 includes receiving a set of tabular data records, each tabular data record of the set of tabular data records comprising a plurality of features. This set of tabular data records corresponds to the collected tabular data records 130, where the method 400 is directed to training a generator model of a synthetic tabular data generator (such as synthetic tabular data generator 120) to produce realistic synthetic tabular data records, while preserving the intra-feature correlations such that the synthetic tabular data records suitable for training machine language models. As discussed above, collected tabular data records, particularly when collected from multiple sources, tend to be incomplete, noisy, and under-balanced with respect to feature distributions, rendering such data inadequate for training a machine learning model to perform, for example, feature inference or prediction tasks. Moreover, because collecting tabular data records is costly in terms of costs, time, equipment, and computing resources, to collect, the number of tabular data records available may be inadequate to complete the training of a machine learning model for a desired task.

The method 400 at 412 includes training a first machine learning model using the set of tabular data records to learn one or more correlations between the plurality of features. For example, training the first machine learning model can include a denoising variational autoencoder training processes that is executed to train a denoising variational autoencoder (such as denoising variational autoencoder 114). The denoising variational autoencoder 114 is trained by the denoising variational autoencoder training processes using tabular data records (e.g. from collected tabular data records 130) that are partially corrupted by the introduction of noise, to predict the value of features masked by the noise. In some embodiments, training the first machine learning model comprises training an encoder-decoder machine learning model to learn one or more correlations between a plurality of features of a set of tabular data records based on noised tabular data record samples derived from the set of tabular data records. The denoising variational autoencoder is trained to predict the corrupted values to reconstruct tabular data records reflecting the value of features as they were in the original tabular data records before the noise was introduced. While learning to denoise the corrupted tabular data records, the denoising variational autoencoder ultimately also learns the multivariant inter-feature correlations present between the features of the collected tabular data records.

The method 400 at 414 includes training a second machine learning model, using the first machine learning model, to generate a set of synthetic tabular data records based at least on the one or more correlations between the plurality of features. In some embodiments, the second machine learning model comprises a generative adversarial network that includes a generator model and a critic model, the variational autoencoder coupled between the generator model and the critic model. In some embodiments, training a second machine learning model comprises training a framework such as the DVAE-TGAN framework 116 described herein. The second machine learning includes a generator model that is encoded with the inter-feature correlations learned by the first machine learning model, thus maintaining in the set of synthetic tabular data, the correlations present in the original tabular data collected from real data sources. That is, the generator model of the second machine learning model is trained to operate as a conditional generative network using an adversarial principle to produce synthesize tabular data records that are realistic in that they preserve multivariant inter-feature correlations and other characteristics exhibited by real data in collected tabular data records. The synthesize tabular data records produced by the generator network can be used to efficiently train machine learning models and/or perform other tasks such as, but not limited to, performing simulations and/or beta testing of applications or systems.

FIG. 5 is a diagram illustrating a method for training a variational autoencoder (such as denoising variational autoencoder 114) in accordance with an example embodiment. It should be understood that the features and elements described herein with respect to the method 500 of FIG. 5 can be used in conjunction with, in combination with, or substituted for elements of, any of the other embodiments discussed herein and vice versa. Further, it should be understood that the functions, structures, and other descriptions of elements for embodiments described in FIG. 5 can apply to like or similarly named or described elements across any of the figures and/or embodiments described herein and vice versa. In some embodiments, elements of method 500 are implemented using the DVAE training process 112 for training a denoising variational autoencoder 114 disclosed above, and executed as operations by one or more processing device.

The method 500, in some embodiments, comprises training the variational autoencoder to learn one or more correlations between a plurality of features of collected tabular data records (such as collected tabular data records 130) by iteratively performing the following. The method 500 at 510 includes producing a noised tabular data record sample by introducing a noise to a tabular data record of a set of tabular data records, wherein the noise masks a feature of the tabular data record. In some embodiments, the set of tabular data records comprises a set of collected tabular records comprising real data, such as the tabular data 205 sampled from collected tabular data records 130. In some embodiments, the set of collected tabular records also, or instead, comprise previously generated synthetic data. A noised tabular data record sample can be produced by a noise masking function (such as noise masking function 210) that receives one or more record samples of collected tabular data and introduces noise that masks one or more features in each record of the collected tabular data. While learning to denoise the corrupted tabular data records, the variational autoencoder ultimately also learns the multivariant inter-feature correlations present between the features of the set of tabular data records.

The method 500 at 512 includes generating a denoised tabular data record sample based on the noised tabular data record sample, wherein the denoised tabular data record sample comprises a prediction of the feature masked by the noise. As discussed above, in some embodiments, the noise masking function masks the features of one or more randomly chosen columns of the tabular data and the variational autoencoder reconstructs the entire tabular data record. In this way the variational autoencoder learns the correlations between the masked features and the remaining noncorrupted features. Since the choice of feature(s) to corrupt is random at each training iteration, the variational autoencoder learns complex interactions and relationships across columns (and thereby across features) in the tabular data.

The method 500 at 514 includes adjusting the variational autoencoder based on a reconstruction loss computed from a difference between the denoised tabular data record sample and the tabular data record of the set of tabular data records. In some embodiments, the reconstruction loss is computed by a reconstruction loss optimizer (e.g., such as reconstruction loss optimizer 240) based on the differences between the tabular data record and the denoised tabular data record sample. The reconstruction loss optimizer iteratively adjusts the encoder model and/or the decoder model of the variational autoencoder using the reconstruction loss as feedback to reduce the reconstruction loss, thus improving the ability of the variational autoencoder to produce de-noised tabular data that preserves the inter-feature correlations found in the collected tabular data records.

FIG. 6 is a diagram illustrating a method for generative adversarial training of a generator model (such as generator model 122) in accordance with an example embodiment. It should be understood that the features and elements described herein with respect to the method 600 of FIG. 6 can be used in conjunction with, in combination with, or substituted for elements of, any of the other embodiments discussed herein and vice versa. Further, it should be understood that the functions, structures, and other descriptions of elements for embodiments described in FIG. 6 can apply to like or similarly named or described elements across any of the figures and/or embodiments described herein and vice versa. In some embodiments, elements of method 600 are implemented using the DVAE-TGAN training process 118 disclosed above, and executed as operations by one or more processing device.

The method 600 comprises training a generative adversarial network using the variational autoencoder (e.g., trained using method 400) to generate a set of synthetic tabular data records by iteratively performing the following. In some embodiments, the generative adversarial network includes a generator model, a critic model, and the variational autoencoder, where the variational autoencoder is incorporated between the generator model and the critic mode.

In some embodiments, the generator model is trained to operate as a conditional generative network by a GAN framework (e.g., such as DVAE-TGAN framework 116) using an adversarial principle to produce synthesize tabular data records that are realistic in that they preserve multivariant inter-feature correlations and other characteristics exhibited by the collected tabular data records.

The method 600 at 610 includes generating an initial synthetic tabular data record sample with the generator model, the initial synthetic tabular data record sample comprising the plurality of features. During training, the generator model is fed a noise input comprising samples of random noise (e.g., from a Gaussian noise distribution) and produces an output of one or more initial synthetic tabular data record samples from that noise input. In some embodiments, the generator model further receives a condition vector as input, as further discussed herein. The generator model produces initial synthetic tabular data record sample that comprise the same tabular structure as the collected tabular data used to train the variational autoencoder. That is, each record sample of the initial synthetic tabular data comprises the same tabular features as records of the collected tabular data. By training the generator model together with the critic model, the GAN framework eventually converges on a deterministic transformation in the generator model that maps the noise input into a distribution in the form of the initial synthetic tabular data.

The method 600 at 612 includes producing a noised synthetic tabular data record sample by introducing a noise to the initial synthetic tabular data record sample, wherein the noise masks a feature of the initial synthetic tabular data record sample. In some embodiments, the noised synthetic tabular data record sample is produced by a noise masking function (e.g., such as noise masking function 332) that receives one or more record samples of the initial synthetic tabular data and introduces noise that masks one or more features in each record of the initial synthetic tabular data to produce the noised synthetic tabular data 334 (e.g., performing the same function in the same way as the noise masking function 210 discussed above with respect to FIG. 2). The noised initial synthetic tabular data is fed as input to the variational autoencoder.

The method 600 at 614 includes generating a denoised synthetic tabular data record sample using the variational autoencoder based on the noised synthetic tabular data record sample, wherein the denoised synthetic tabular data record sample comprises a prediction of the feature of the initial synthetic tabular data record sample masked by the noise. The variational autoencoder, per its training, generates records of denoised synthetic tabular data that include inferred values (e.g., predictions) for the values of features that were masked by the noise masking function. Because the variational autoencoder is trained as described herein, as the variational autoencoder infers replacements values for the masked features at 614, it preserves the inter-feature correlations that it learned during its training. The variational autoencoder outputs the reconstructed tabular data records, which can be saved as denoised synthetic tabular data. The denoised synthetic tabular data, in turn, are used for computing reconstruction and generator losses for adjusting the generator model and critic model of the DVAE-TGAN framework.

The method 600 at 616 includes adjusting one or both of the generator model and the critic model based on a reconstruction loss computed from a difference between the denoised synthetic tabular data record sample and the initial synthetic tabular data record sample. For example, during training of the DVAE-TGAN framework, the generator model and the critic model engage in a two-play zero-sum task where the generator model iteratively learns to generate more realistic synthetic tabular data, and the critic model iteratively learns how to better discern synthetic tabular data from real (e.g., collected) tabular data. Training iteratively continues, for example, until the generator model achieves an optimal generation quality and the critic model cannot distinguish between real tabular data and synthetic tabular data. In some embodiments, a GAN loss function used for training, often referred to as a min-max loss function, is computed by a min-max loss optimizer (e.g., such as min-max loss optimizer 342). Over the course of training iterations, the generator model attempts to minimize the loss computed by this min-max loss function while the critic model tries to maximize it. In some embodiments, adjusting one or both of the generator model and the critic model comprises computing one or both of a reconstruction loss component and a correlation loss component. For example, a generator loss feedback to the generator model can be computed by a reconstruction-correlation loss optimizer (e.g., such as reconstruction-correlation loss optimizer 350) which can comprise one or both of a reconstruction loss component and a correlation loss component, as previously discussed herein. In some embodiments, the reconstruction loss is computed at least in part based on a Pearson coefficient matrix computed based on the set of tabular data records and the set of denoised synthetic tabular data records. In some embodiments, the method determines a first distribution characteristic based on the set of tabular data records and a second distribution characteristic based on the set of denoised synthetic tabular data records, and the critic model computes a realness score using the first distribution characteristic and the second distribution characteristic. Then, one or both of the generator model and the critic model are adjusted based on a generator loss computed from the realness score.

In some embodiments, the method 600 further include adjusting the generator model based on a condition vector. The initial synthetic tabular data record sample is generated by conditioning a feature of the plurality of features based at least on the condition vector, as discussed above. In some embodiments, the condition vector is computed based at least in part on a distribution of the plurality of features within the set of tabular data records.

The resulting generator model generates tabular data records that are realistic as compared to the collected tabular records, including preservation of inter-feature correlations within individual synthetic tabular data records. As such, one or more other machine models, in some embodiments, are subsequently be trained using a set of synthetic tabular data records that are generated by the generator model.

In some embodiments, additional conditioning is incorporated into the training of the variational autoencoder, for example to further protect the privacy of real individuals whose information may be included in the collected tabular data records used for training the variational autoencoder. More specifically, the introduction of noise for masking features is not applied to features in selected columns corresponding to features selected for extra privacy. This ensures that an adversarial attacker model trained on synthetic data generated by a generator model, such as generator model 112, will not perform well when evaluated on real data. That is, when there are certain attributes of the real data—such as the value of data populating certain feature fields, that it would be undesirable for the variational autoencoder to learn how to infer during training, then the variational autoencoder can be inhibited from learning the intra-feature correlations needed to infer that feature by prohibiting that feature from being masked by noise during training of the variational autoencoder. For example, if the variational autoencoder is exclusively, or almost exclusively, fed unmasked real data values for protected features during training, then the variational autoencoder never learns the skill of reconstructing values for those protected feature and thus never learns any intra-feature correlations needed to make such predictions. As a consequence, values for those selected features are still generated by the generator model, but the generator model would not have learned how to infer those features based on intra-feature correlations, better ensuring that synthetic tabular data records from the generator model do not include sufficient information to train other machine learning models to reconstruct and/or infer tabular data records accurately corresponding to individuals whose data was present in the original collected tabular data.

Referring now to FIG. 7, FIG. 7 illustrates at 700 an embodiment of a synthetic tabular data generator in a production context for generating synthetic tabular data in accordance with some embodiments. As shown in FIG. 7, a user of user device 102 can interact with the synthetic tabular data generator 120 (e.g., via network 104) to instruct the synthetic tabular data generator 120 to produce a set of records of synthesized tabular data 720. The synthetic tabular data generator 120 comprises generator model 122, which has been trained to produce synthesized tabular data, for example using the DVAE-TGAN framework 116 disclosed herein. The generator model 122 is fed a noise input 712 comprising samples of random noise (e.g., from a Gaussian noise distribution) and produces the synthesized tabular data 720 as an output. In some embodiments, the generator model 122 is further fed a condition vector 710. While during training, a condition vector, such as condition vector 344, can be used to condition the distribution of initial synthetic tabular data 330 to ensure that the generator model 122 within the DVAE-TGAN framework 116 is trained to generate a full spectrum of possible tabular data records, within the context of FIG. 7 the generator model 122 is already fully trained. The condition vector 710 therefore functions as a parameter controllable from user device 102 to adjust the generator model 122 to fine tune the generation of synthesized tabular data 720 (e.g., to suit the particular needs of a user). That is, the condition vector 710 denotes the value of a feature that should appear in the synthesized tabular data 720 that the generator model 122 produces. For example, if possible values for a feature in column i of synthesized tabular data 720 has the three possible values of A, B, and C, then the condition vector 710 instructs the generator model 122 to produce synthesized tabular data 720 having the feature in column i with the value specified by the condition vector 710. This set of synthesized tabular data 720 is stored to the synthesized tabular data records 132, or otherwise made available to an application, such as application 103 and/or a server applications 110, to perform tasks such as, but not limited to, training a machine learning model (e.g., such as machine learning model 105) and/or perform other tasks such as, but not limited to, performing simulations and/or beta testing of applications or systems. In some embodiments, the synthetic tabular data generator 120 is offered as a cloud based service accessible to the user device 102. In other embodiments, the synthetic tabular data generator 120 is at least in part implemented on the user device 102.

Machine learning efficacy metrics evaluate how well synthetic data can replace real collected data, when applied to a machine learning problem. Such an evaluation is performed by training a machine learning model on synthetic tabular data and then evaluating a score obtained when that machine learning model is tested on real tabular data. For example, a column corresponding to a feature of the dataset is selected to serve as a target for a feature prediction problem and scored against the real tabular data, taking into account a weighting factor representing the difficulty of the feature prediction problem the trained generator model is tasked to perform. Such machine learning efficacy metrics indicate that synthetic tabular data generated using embodiments described herein score statistically better compared to baseline scores for prior methods.

FIG. 8 is a diagram illustrating a method for generating synthetic tabular data in accordance with an example embodiment. It should be understood that the features and elements described herein with respect to the method 800 of FIG. 8 can be used in conjunction with, in combination with, or substituted for elements of, any of the other embodiments discussed herein and vice versa. Further, it should be understood that the functions, structures, and other descriptions of elements for embodiments described in FIG. 8 can apply to like or similarly named or described elements across any of the figures and/or embodiments described herein and vice versa. In some embodiments, elements of method 800 are implemented using the synthetic tabular data generator 120 and/or generator model 122 disclosed above, and executed as operations by one or more processing device. The method 800 includes at 810 executing a machine learning model to generate a set of synthetic tabular data records, the respective synthetic tabular data records each comprising a plurality of features. As discussed herein, the machine learning model comprises a generator model trained via a GAN framework (e.g., such as DVAE-TGAN framework 116) to learn how to generate tabular data records where the records exhibit an inter-feature correlation that reflects the inter-feature correlation found in the real data of collected tabular data records (e.g., such as collected tabular data records 130). The method 800 accordingly further includes at 812 generating the set of synthetic tabular data records, the set of synthetic tabular data records comprising a first correlation between features of the plurality of features, the first correlation based at least in part on a second correlation between features of a set of non-synthetic tabular data records, the machine learning model trained to learn the second correlation based on a loss determined using a denoising variational autoencoder. As explained above, the DVAE-TGAN framework 116 includes the denoising variational autoencoder integrated with the generator model and a critic model. Through training of the DVAE-TGAN framework 116, information regarding inter-feature correlations in collected tabular data records that was previously learned by the denoising variational autoencoder is imparted on the generator model, which thus learns itself to generate synthetic tabular data record exhibiting those inter-feature correlations. The method 800 at 814 includes storing the set of synthetic tabular data records to a data store (e.g., such as storing the set of synthetic tabular data records to synthesized tabular data records 132). This set of synthesized tabular data records is available to applications to perform tasks such as, but not limited to, training a machine learning model and/or perform other tasks such as, but not limited to, performing simulations and/or beta testing of applications or systems. As such, in some embodiments, method 800 further includes executing a machine learning model training application to train a second machine learning model based at least on the set of synthetic tabular data records. In some embodiments, method 800 further includes adjusting the machine learning model using a condition vector (e.g., such as condition vector 710). The condition vector functions as a parameter adjust the generator model to fine tune the generation of synthesized tabular data records. Accordingly, in such embodiments, the method 800 further includes generating the set of synthetic tabular data records by conditioning a feature of the plurality of features based at least on the condition vector.

Figure 9:
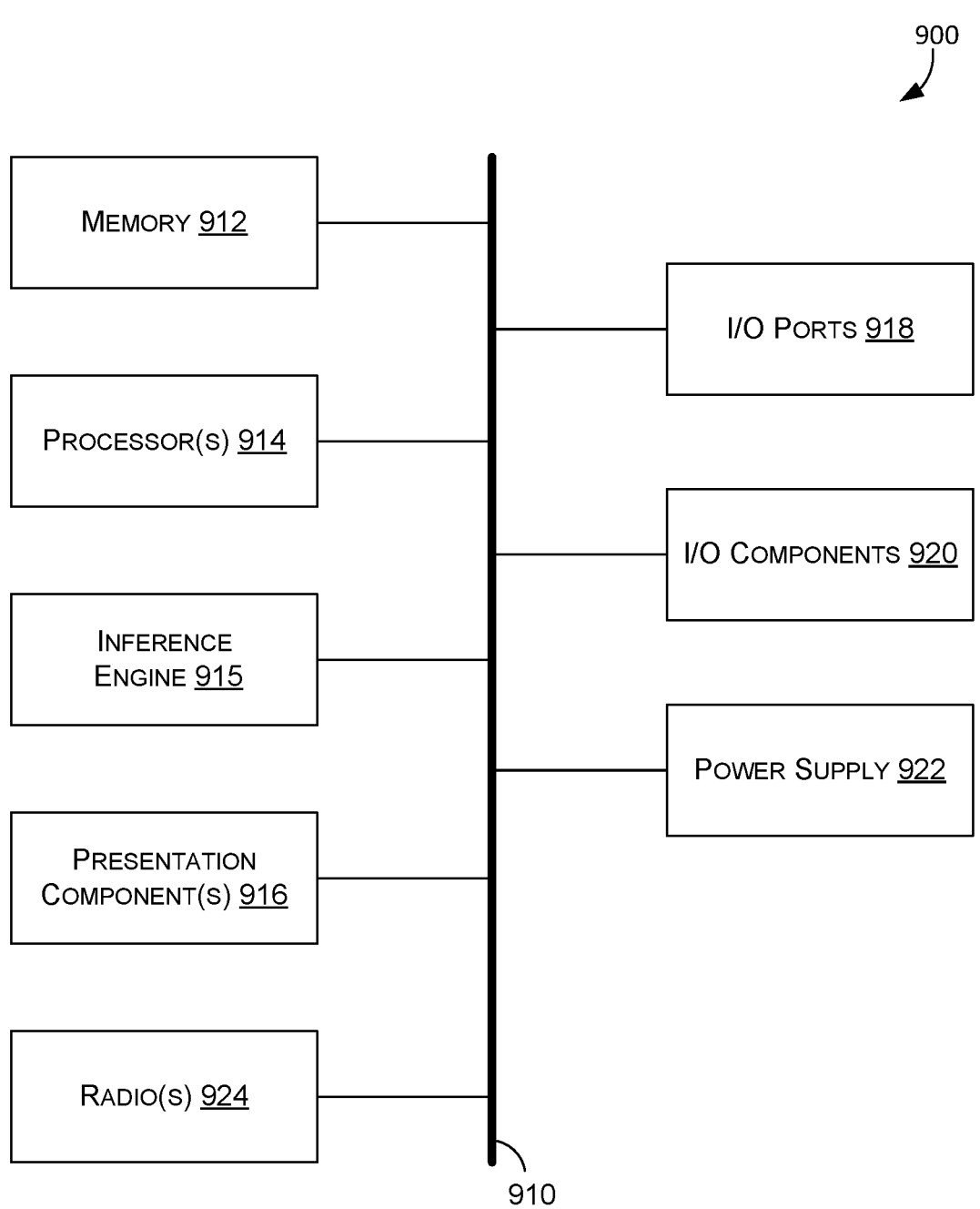
FIG. 9 is a diagram illustrating an example computing environment in accordance with embodiments of the present disclosure.

With regard to FIG. 9, one exemplary operating environment for implementing aspects of the technology described herein is shown and designated generally as computing device 900. Computing device 900 is just one example of a suitable computing environment and is not intended to suggest any limitation as to the scope of use or functionality of the technology described herein. Neither should the computing device 900 be interpreted as having any dependency or requirement relating to any one or combination of components illustrated.

The technology described herein can be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein, including the DVAE training process 112, autoencoder 114, DVAE-TGAN framework 116, DVAE-TGAN training process 118, synthetic tabular data generator 120, generator model 122, and/or the application 103 (for example), can be practiced in a variety of system configurations, including handheld devices, consumer electronics, general-purpose computers, and specialty computing devices. Aspects of the technology described herein can also be practiced in distributed computing environments where tasks are performed by remote-processing devices that are linked through a communications network such as network 104. In other words, one or more aspects of user device 102 and/or server(s) 108 may be implemented using a computing device such as computing device 900.

With continued reference to FIG. 9, computing device 900 includes a bus 910 that directly or indirectly couples the following devices: a memory 912 (e.g., a memory component), one or more processors 914, a neural network inference engine 915, one or more presentation components 916, input/output (I/O) ports 918, I/O components 920, an illustrative power supply 922, and one or more radio(s) 1024. Bus 910 represents one or more busses (such as an address bus, data bus, or combination thereof). Although the various blocks of FIG. 9 are shown with lines for the sake of clarity, it should be understood that one or more of the functions of the components can be distributed between components. For example, a presentation component 916 such as a display device (e.g., which can be used to by application 103 to display various outputs) can also be considered an I/O component 920. The diagram of FIG. 9 is merely illustrative of an exemplary computing device that can be used in connection with one or more aspects of the technology described herein. Distinction is not made between such categories as "workstation," "server," "laptop," "tablet," "smart phone" or "handheld device," as all are contemplated within the scope of FIG. 9 and refer to "computer" or "computing device."

Memory 912 includes non-transient computer storage media in the form of volatile and/or nonvolatile memory. The memory 912 can be removable, non-removable, or a combination thereof. Exemplary memory includes solid-state memory, hard drives, and optical-disc drives. Computing device 900 includes one or more processors 914 that read data from various entities such as bus 910, memory 912, or I/O components 920. Presentation component(s) 916 present data indications to a user or other device and in some embodiments, comprises a human-machine interface (HMI) display for presenting a user interface for application 103.

Neural network inference engine 915 comprises a neural network coprocessor, such as but not limited to a graphics processing unit (GPU), configured to execute a deep neural network (DNN) and/or machine learning models. In some embodiments, machine learning models for the autoencoder 114, generator model 112 and/or critic model 322 are implemented at least in part by the neural network inference engine 915. Exemplary presentation components 916 include a display device, speaker, printing component, and vibrating component. I/O port(s) 918 allow computing device 900 to be logically coupled to other devices including I/O components 920, some of which can be built in. Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which can include, by way of example only, a pen or a stylus) are provided in order to digitally capture freehand user input. The connection between the pen digitizer and processor(s) 914 can be direct or via a coupling utilizing a serial port, parallel port, and/or other interface and/or system bus known in the art. Furthermore, the digitizer input component can be a component separated from an output component such as a display device, or in some aspects, the usable input area of a digitizer can be coextensive with the display area of a display device, integrated with the display device, or can exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs can be interpreted as ink strokes for presentation in association with the computing device 900. These requests can be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900, in some embodiments, is be equipped with depth cameras, such as stereoscopic camera systems, infrared camera systems, RGB camera systems, and combinations of these, for gesture detection and recognition. Additionally, the computing device 900, in some embodiments, is equipped with accelerometers or gyroscopes that enable detection of motion. The output of the accelerometers or gyroscopes can be provided to the display of the computing device 900 to render immersive augmented reality or virtual reality. A computing device, in some embodiments, includes radio(s) 924. The radio 924 transmits and receives radio communications. The computing device can be a wireless terminal adapted to receive communications and media over various wireless networks.

Figure 10:
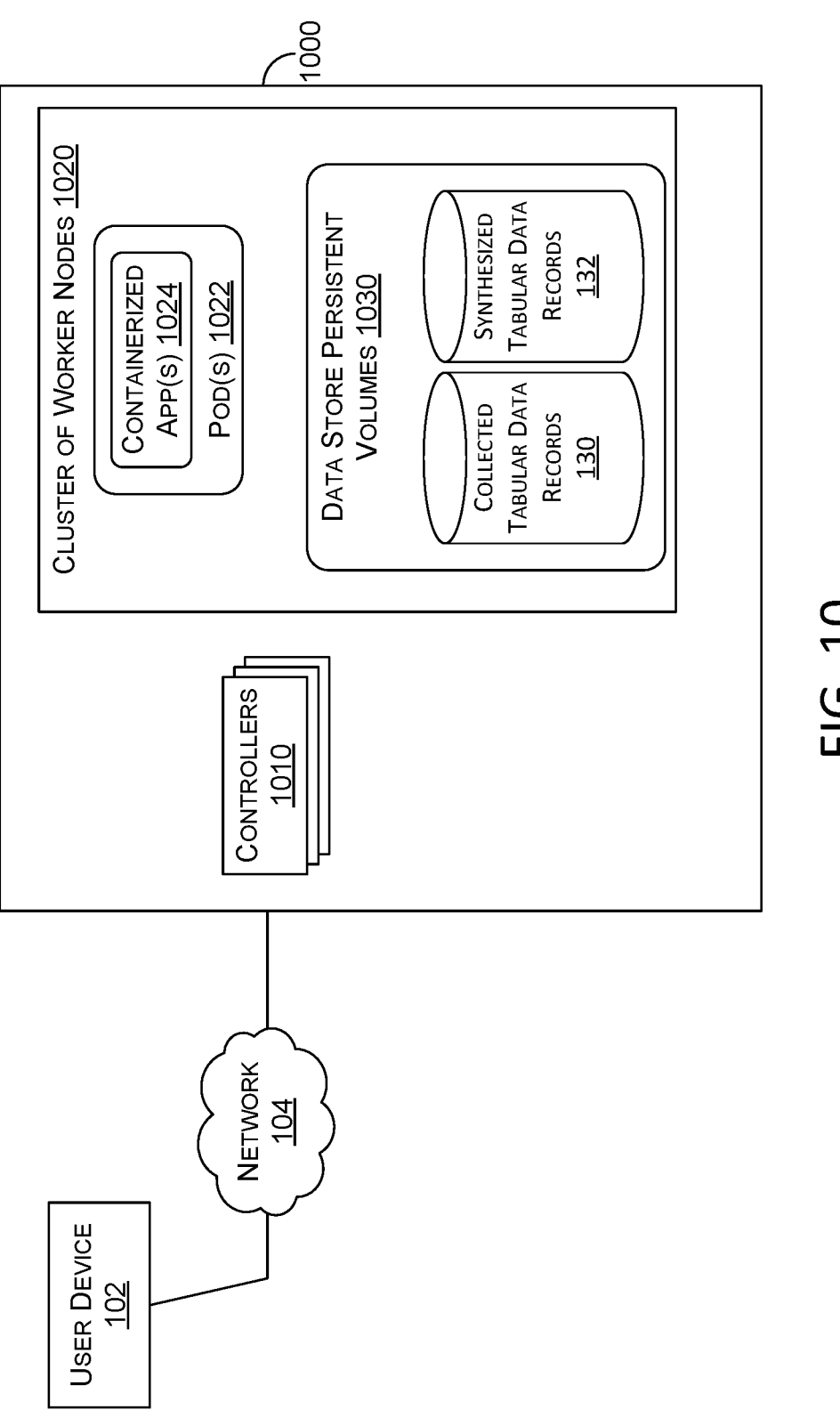
FIG. 10 is a diagram illustrating an example cloud based computing environment in accordance with embodiments of the present disclosure.

FIG. 10 is a diagram illustrating a cloud based computing environment 1000 for implementing one or more aspects of the server applications 110, including the DVAE training process 112, autoencoder 114, DVAE-TGAN framework 116, DVAE-TGAN training process 118, synthetic tabular data generator 120, generator model 112 and/or critic model 322 discussed with respect to any of the embodiments discussed herein. Cloud based computing environment 1000 comprises one or more controllers 1010 that each comprises one or more processors and memory, each programmed to execute code to establish a cloud base computing platform executing at least part of the application 103, DVAE training process 112, autoencoder 114, DVAE-TGAN framework 116, DVAE-TGAN training process 118, synthetic tabular data generator 120, generator model 112 and/or critic model 322.

In one embodiment, the one or more controllers 1010 comprise server components of a data center. For example, in one embodiment the DVAE training process 112, autoencoder 114, DVAE-TGAN framework 116, DVAE-TGAN training process 118, synthetic tabular data generator 120, generator model 112 and/or critic model 322 and/or the application 103 are virtualized network services running on a cluster of worker nodes 1020 established on the controllers 1010. For example, the cluster of worker nodes 1020 can include one or more of Kubernetes (K8s) pods 1022 orchestrated onto the worker nodes 1020 to realize one or more containerized applications 1024 for the DVAE training process 112, autoencoder 114, DVAE-TGAN framework 116, DVAE-TGAN training process 118, synthetic tabular data generator 120, generator model 112 and/or critic model 322 and/or the application 103. In some embodiments, the user device 102 can be coupled to the controllers 1010 by a network 104 (for example, a public network such as the Internet, a proprietary network, or a combination thereof). In such an embodiment, one or more of the DVAE training process 112, autoencoder 114, DVAE-TGAN framework 116, DVAE-TGAN training process 118, synthetic tabular data generator 120, generator model 112 and/or critic model 322 and/or the application 103 are at least partially implemented by the containerized applications 1024. In some embodiments the cluster of worker nodes 1020 includes one or more one or more data store persistent volumes 1030 that implement the data store 106. In some embodiments collected tabular data records 130 and/or synthesized tabular data records 132 are saved to the data store persistent volumes 1030 and/or other ground truth data for training one or more of machine learning models disclosed herein is received from the data store persistent volumes 1030.

In various alternative embodiments, system and/or device elements, method steps, or example implementations described throughout this disclosure (such as the DVAE training process 112, autoencoder 114, DVAE-TGAN framework 116, DVAE-TGAN training process 118, synthetic tabular data generator 120, generator model 112 and/or critic model 322, or any of the modules or sub-parts of any thereof, for example) can be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure can include elements comprising program instructions resident on computer readable media which when implemented by such computer systems, enable them to implement the embodiments described herein. As used herein, the terms "computer readable media", "computer readable medium", and "computer storage media" refer to tangible memory storage devices having non-transient physical forms and includes both volatile and nonvolatile, removable and non-removable media. Such non-transient physical forms can include computer memory devices, such as but not limited to: punch cards, magnetic disk or tape, or other magnetic storage devices, any optical data storage system, flash read only memory (ROM), non-volatile ROM, programmable ROM (PROM), erasable-programmable ROM (E-PROM), Electrically erasable programmable ROM (EEPROM), random access memory (RAM), CD-ROM, digital versatile disks (DVD), or any other form of permanent, semi-permanent, or temporary memory storage system of device having a physical, tangible form. By way of example, and not limitation, computer-readable media can comprise computer storage media and communication media. Computer storage media does not comprise a propagated data signal. Program instructions include, but are not limited to, computer executable instructions executed by computer system processors and hardware description languages such as Very High Speed Integrated Circuit (VHSIC) Hardware Description Language (VHDL).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and can be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that can be practiced. It is to be understood that other embodiments can be utilized and structural or logical changes can be made without departing from the scope of the present disclosure. Therefore, the preceding detailed description is not to be taken in the limiting sense, and the scope of embodiments is defined by the appended claims and their equivalents.

What is claimed is:

1. A system comprising:

a memory component; and one or more processing devices coupled to the memory component, the one or more processing devices to perform operations comprising:

receiving a set of tabular data records, each tabular data record of the set of tabular data records comprising a plurality of features;

training a first machine learning model using the set of tabular data records to learn one or more correlations between the plurality of features, the first machine learning model comprising a variational autoencoder; and training a second machine learning model, using the first machine learning model, to generate a set of synthetic tabular data records based at least on the one or more correlations between the plurality of features, the second machine learning model comprising a generative adversarial network that includes a generator model and a critic model, the variational autoencoder coupled between the generator model and the critic model.

2. The system of claim 1, wherein the first machine learning model comprises the variational autoencoder, the operations further comprising:

training the variational autoencoder to learn the one or more correlations between the plurality of features by iteratively:

producing a noised tabular data record sample by introducing a noise to a first tabular data record of the set of tabular data records, wherein the noise masks a feature of the first tabular data record;

generating a denoised tabular data record sample based on the noised tabular data record sample, wherein the denoised tabular data record sample comprises a prediction of the feature masked by the noise; and adjusting the variational autoencoder based on a reconstruction loss computed from a difference between the denoised tabular data record sample and the first tabular data record of the set of tabular data records.

3. The system of claim 1, wherein the first machine learning model comprises the variational autoencoder and the second machine learning model comprises a generative adversarial network that includes a generator model and a critic model, the operations further comprising:

training the generative adversarial network using the variational autoencoder to generate the set of synthetic tabular data records by iteratively:

generating an initial synthetic tabular data record sample with the generator model, the initial synthetic tabular data record sample comprising the plurality of features;

producing a noised synthetic tabular data record sample by introducing a noise to the initial synthetic tabular data record sample, wherein the noise masks a feature of the initial synthetic tabular data record sample;

generating a denoised synthetic tabular data record sample using the variational autoencoder based on the noised synthetic tabular data record sample, wherein the denoised synthetic tabular data record sample comprises a prediction of the feature of the initial synthetic tabular data record sample masked by the noise; and adjusting one or both of the generator model and the critic model based on a reconstruction loss computed from a difference between the denoised synthetic tabular data record sample and the initial synthetic tabular data record sample.

4. The system of claim 3, the operations further comprising:

adjusting the generator model based on a condition vector; and generating the initial synthetic tabular data record sample by conditioning a first feature of the plurality of features based at least on the condition vector.

5. The system of claim 4, the operations further comprising:

computing the condition vector based at least in part on a distribution of the plurality of features within the set of tabular data records.

6. The system of claim 3, the operations further comprising:

storing the denoised synthetic tabular data record sample to a set of denoised synthetic tabular data records; and determining the reconstruction loss at least in part based on a Pearson coefficient matrix computed based on the set of tabular data records and the set of denoised synthetic tabular data records.

7. The system of claim 3, the operations further comprising:

storing the denoised synthetic tabular data record sample to a set of denoised synthetic tabular data records;

determining a first distribution characteristic based on the set of tabular data records and determining a second distribution characteristic based on the set of denoised synthetic tabular data records, wherein the critic model computes a realness score using the first distribution characteristic and the second distribution characteristic; and adjusting one or both of the generator model and the critic model based on a generator loss computed from the realness score.

8. The system of claim 1, wherein the second machine learning model comprises a generative adversarial network that includes a generator model and a critic model, the operations further comprising:

generating the set of synthetic tabular data records with the generator model; and training a third machine model using the set of synthetic tabular data records.

9. A method comprising:

producing a variational autoencoder by training an encoder-decoder machine learning model to learn one or more correlations between a plurality of features of a set of tabular data records based on noised tabular data record samples derived from the set of tabular data records;

producing a generative adversarial network that comprises a generator model, a critic model, and the variational autoencoder, wherein the variational autoencoder is coupled between the generator model and the critic model; and training the generator model to generate a set of synthetic tabular data records based at least on the one or more correlations between the plurality of features using a first loss computed from an output of the variational autoencoder and a second loss computed from an output of the critic model.

10. The method of claim 9, further comprising:

training the encoder-decoder machine learning model to learn the one or more correlations between the plurality of features by iteratively:

producing a noised tabular data record sample by introducing a noise to a first tabular data record of the set of tabular data records, wherein the noise masks a feature of the first tabular data record;

generating a denoised tabular data record sample based on the noised tabular data record sample, wherein the denoised tabular data record sample comprises a prediction of the feature masked by the noise; and adjusting the encoder-decoder machine learning model based on a reconstruction loss computed from a difference between the denoised tabular data record sample and the first tabular data record of the set of tabular data records.

11. The method of claim 10, further comprising:

designating a first feature of the plurality of features as a protected feature; and wherein the first feature is not masked by the noise when training the encoder-decoder machine learning model.

12. The method of claim 9, further comprising:

training the generative adversarial network using the variational autoencoder to generate the set of synthetic tabular data records by iteratively:

generating an initial synthetic tabular data record sample with the generator model, the initial synthetic tabular data record sample comprising the plurality of features;

producing a noised synthetic tabular data record sample by introducing a noise to the initial synthetic tabular data record sample, wherein the noise masks a feature of the initial synthetic tabular data record sample;

generating a denoised synthetic tabular data record sample using the variational autoencoder based on the noised synthetic tabular data record sample, wherein the denoised synthetic tabular data record sample comprises a prediction of the feature of the initial synthetic tabular data record sample masked by the noise; and adjusting one or both of the generator model and the critic model based on a reconstruction loss computed from a difference between the denoised synthetic tabular data record sample and the initial synthetic tabular data record sample.

13. The method of claim 12, further comprising:

storing the denoised synthetic tabular data record sample to a set of denoised synthetic tabular data records; and determining the reconstruction loss at least in part based on a Pearson coefficient matrix computed based on the set of tabular data records and the set of denoised synthetic tabular data records.

14. The method of claim 12, further comprising:

storing the denoised synthetic tabular data record sample to a set of denoised synthetic tabular data records;

determining a first distribution characteristic based on the set of tabular data records and determining a second distribution characteristic based on the set of denoised synthetic tabular data records, wherein the critic model computes a realness score using the first distribution characteristic and the second distribution characteristic; and adjusting one or both of the generator model and the critic model based on a generator loss computed from the realness score.

15. The method of claim 12, further comprising:

adjusting the generator model based on a condition vector; and generating the initial synthetic tabular data record sample by conditioning a first feature of the plurality of features based at least on the condition vector.

16. The method of claim 15, further comprising:

computing the condition vector based at least in part on a distribution of the plurality of features within the set of tabular data records.

17. A system comprising:

a memory component; and one or more processing devices coupled to the memory component, the one or more processing devices to perform operations comprising:

executing a generator model, wherein the generator model was trained using a generative adversarial network architecture comprising the generator model, a critic model, and a denoising variational autoencoder coupled between the generator model and the critic model;

generating, using the generator model, a first set of synthetic tabular data records, wherein respective synthetic tabular data records individually comprise a plurality of features and having a first correlation between features of the plurality of features, the first correlation based at least in part on a second correlation between features of a second set of tabular data records, the generator model further trained to learn the second correlation based on a loss determined using the denoising variational autoencoder; and storing the first set of synthetic tabular data records to a data store.

18. The system of claim 17, the operations further comprising:

executing a machine learning model training application to train a second machine learning model based at least on the first set of synthetic tabular data records.

19. The system of claim 17, the operations further comprising:

adjusting the generator model using a condition vector; and generating the first set of synthetic tabular data records by conditioning a feature of the plurality of features based at least on the condition vector.

\* \* \* \* \*